(12) United States Patent
Li et al.

(10) Patent No.: US 10,904,553 B2
(45) Date of Patent: Jan. 26, 2021

(54) METHOD AND APPARATUS FOR VIDEO CODING

(71) Applicant: Tencent America LLC, Palo Alto, CA (US)

(72) Inventors: Guichun Li, Milpitas, CA (US); Xiang Li, Saratoga, CA (US); Xiaozhong Xu, State College, PA (US); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 0 days.

(21) Appl. No.: 16/748,462

(22) Filed: Jan. 21, 2020

(65) Prior Publication Data

US 2020/0236383 A1    Jul. 23, 2020

Related U.S. Application Data

(60) Provisional application No. 62/795,521, filed on Jan. 22, 2019.

(51) Int. Cl.
*H04N 19/51* (2014.01)
*H04N 19/176* (2014.01)
*H04N 19/105* (2014.01)
*H04N 19/52* (2014.01)
*H04N 19/513* (2014.01)

(52) U.S. Cl.
CPC .......... *H04N 19/51* (2014.11); *H04N 19/105* (2014.11); *H04N 19/176* (2014.11); *H04N 19/513* (2014.11); *H04N 19/52* (2014.11)

(58) Field of Classification Search
None
See application file for complete search history.

(56) References Cited

U.S. PATENT DOCUMENTS

| | | | |
|---|---|---|---|
| 2004/0252230 A1 | 12/2004 | Winder | |
| 2014/0348241 A1* | 11/2014 | Lim | H04N 19/513 375/240.16 |
| 2015/0172657 A1 | 6/2015 | Chong et al. | |
| 2016/0366435 A1 | 12/2016 | Chien et al. | |
| 2017/0019680 A1 | 1/2017 | Lee et al. | |

(Continued)

FOREIGN PATENT DOCUMENTS

WO    WO-2018099269 A1 *  6/2018  ............. H09N 19/52

OTHER PUBLICATIONS

PCT International Search Report and Written Opinion Issued in Application PCT/US2020/014574 dated Apr. 24, 2020, (15 pages).

*Primary Examiner* — Rebecca A Volentine

(74) *Attorney, Agent, or Firm* — Oblon, McClelland, Maier & Neustadt, L.L.P.

(57) ABSTRACT

Aspects of the disclosure provide methods and apparatuses for video encoding/decoding. In some examples, an apparatus for video decoding includes receiving circuitry and processing circuitry. The processing circuitry decodes prediction information of a current block in a current picture from a coded video bitstream. The prediction information is indicative of a sub-block based merge mode. Then, the processing circuitry decodes offset information from the coded video bitstream and reconstructs a sample in a sub-block of the current block according to motion information of the sub-block that is determined based on the sub-block based merge mode and the offset information.

18 Claims, 16 Drawing Sheets

(56) References Cited

U.S. PATENT DOCUMENTS

2018/0098063 A1\* 4/2018 Chen .................... H04N 19/139
2018/0310017 A1   10/2018 Chen et al.
2020/0107043 A1\* 4/2020 Hung ................... H04N 19/521
2020/0195963 A1\* 6/2020 Li ....................... H04N 19/176

\* cited by examiner

METHOD AND APPARATUS FOR VIDEO CODING

INCORPORATION BY REFERENCE

This present application claims the benefit of priority to U.S. Provisional Application No. 62/795,521, "SUB-BLOCK-BASED MERGE CANDIDATES WITH OFFSETS" filed on Jan. 22, 2019, which is incorporated by reference herein in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding can be performed using inter-picture prediction with motion compensation. Uncompressed digital video can include a series of pictures, each picture having a spatial dimension of, for example, 1920× 1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of video coding and decoding can be the reduction of redundancy in the input video signal, through compression. Compression can help reduce the aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described here is a technique henceforth referred to as "spatial merge".

Referring to FIG. 1, a current block (101) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (102 through 106, respectively). In H.265, the MV prediction can use predictors from the same reference picture that the neighboring block is using.

SUMMARY

Aspects of the disclosure provide methods and apparatuses for video encoding/decoding. In some examples, an apparatus for video decoding includes receiving circuitry and processing circuitry. The processing circuitry decodes prediction information of a current block in a current picture from a coded video bitstream. The prediction information is indicative of a sub-block based merge mode. Then, the processing circuitry decodes offset information from the coded video bitstream and reconstructs a sample in a sub-block of the current block according to motion information of the sub-block that is determined based on the sub-block based merge mode and the offset information.

In some embodiments, the sub-block based merge mode is affine merge mode with motion vector difference, and the processing circuitry selects an offset table from multiple predefined tables based on a control point motion vector of the current block.

In an embodiment, the processing circuitry selects the offset table from the multiple predefined tables based on at least one of a magnitude of the control point motion vector, a precision of the control point motion vector, a magnitude of a fractional part of the control point motion vector, a magnitude of a difference between a first control point motion vector and a second control point motion vector, and a magnitude of a fractional part of a difference between the first control point motion vector and the second control point motion vector.

In another embodiment, the processing circuitry selects an offset direction table from the multiple predefined tables based on the control point motion vector of the current block. In another embodiment, the processing circuitry selects a distance offset table from the multiple predefined tables based on the control point motion vector of the current block.

In some embodiments, a base candidate of the current block in the affine merge mode with motion vector difference is bi-predicted based on a first reference picture and a second reference picture, the processing circuitry applies the offset information to a first motion vector associated with the first reference picture and a second motion vector associated with the second reference picture based on temporal distances from the current picture to the first reference picture and the second reference picture.

In an example, the processing circuitry applies a same offset to the first motion vector associated with the first reference picture and the second motion vector associated with the second reference picture. In another example, the processing circuitry applies offsets with a same magnitude and opposite signs to the first motion vector associated with the first reference picture and the second motion vector associated with the second reference picture. In another example, the processing circuitry applies offsets that are scaled according to the temporal distances to the first motion vector and the second motion vector to the first motion vector and the second motion vector.

In some embodiments, the sub-block based merge mode is affine merge mode with affine parameter difference, and the processing circuitry applies an offset on at least an affine parameter. In an example, the processing circuitry selects the offset and the affine parameter according to predefined tables and an index decoded from the coded video bitstream.

In some embodiments, the sub-block based merge mode is sub-block based temporal motion vector prediction (SbTMVP) mode. In an example, the processing circuitry applies a same motion vector offset to respective motion vectors of the sub-blocks. In another example, the processing circuitry applies the motion vector offset and a scaled motion vector offset respectively to a first motion vector of a first sub-block and a second motion vector of a second sub-block.

In some embodiments, the processing circuitry forms a base candidate group including one or more base candidates and selects a base candidate from the base candidate group. In some examples, the processing circuitry decodes an index from the coded video bitstream when a number of base candidates is larger than one.

Aspects of the disclosure also provide a non-transitory computer-readable medium storing instructions which when executed by a computer for video decoding cause the computer to perform the method for video decoding.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Figure 2:
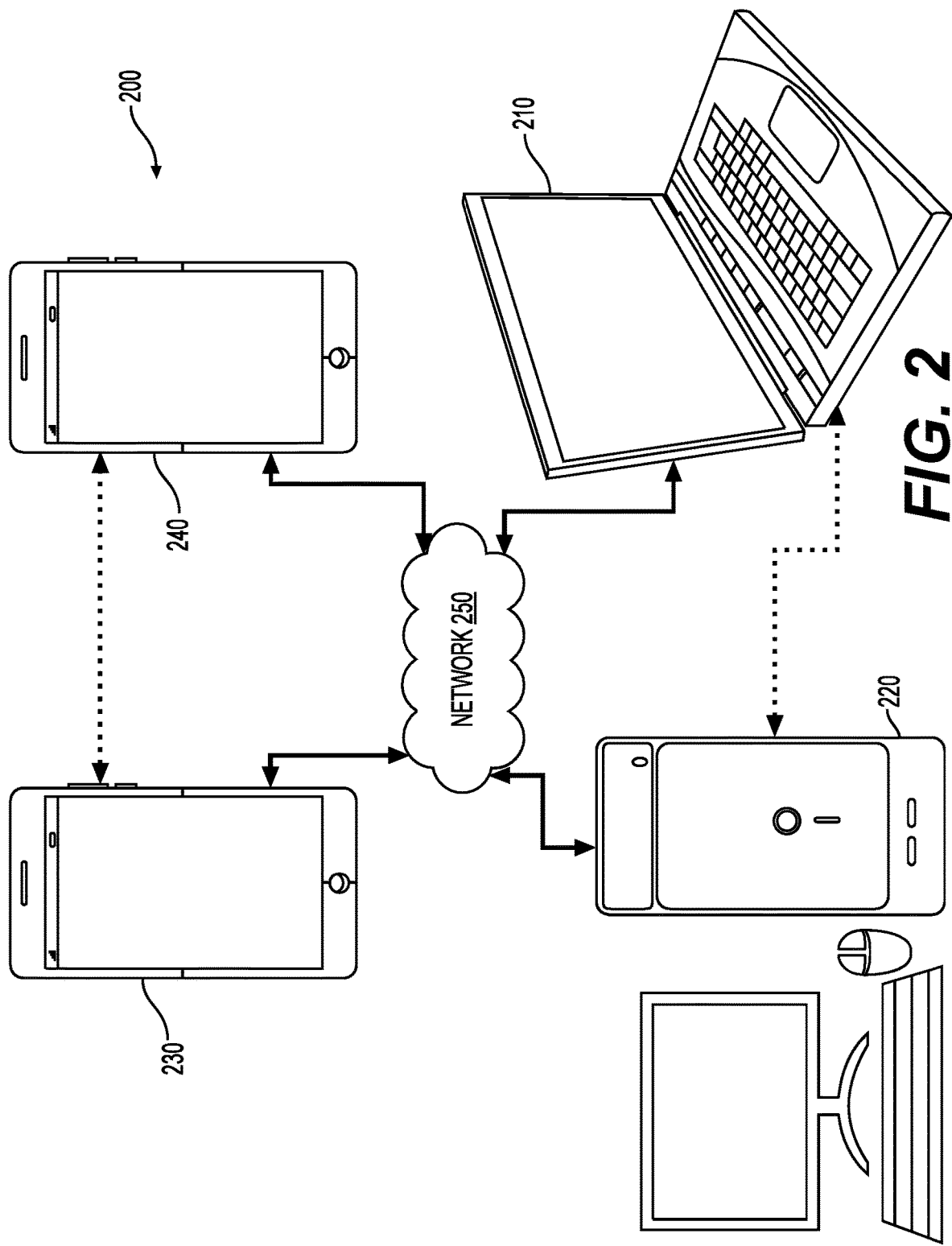
FIG. 2 is a schematic illustration of a simplified block diagram of a communication system (200) in accordance with an embodiment.

FIG. 2 illustrates a simplified block diagram of a communication system (200) according to an embodiment of the present disclosure. The communication system (200) includes a plurality of terminal devices that can communicate with each other, via, for example, a network (250). For example, the communication system (200) includes a first pair of terminal devices (210) and (220) interconnected via the network (250). In the FIG. 2 example, the first pair of terminal devices (210) and (220) performs unidirectional transmission of data. For example, the terminal device (210) may code video data (e.g., a stream of video pictures that are captured by the terminal device (210)) for transmission to the other terminal device (220) via the network (250). The encoded video data can be transmitted in the form of one or more coded video bitstreams. The terminal device (220) may receive the coded video data from the network (250), decode the coded video data to recover the video pictures and display video pictures according to the recovered video data. Unidirectional data transmission may be common in media serving applications and the like.

In another example, the communication system (200) includes a second pair of terminal devices (230) and (240) that performs bidirectional transmission of coded video data that may occur, for example, during videoconferencing. For bidirectional transmission of data, in an example, each terminal device of the terminal devices (230) and (240) may code video data (e.g., a stream of video pictures that are captured by the terminal device) for transmission to the other terminal device of the terminal devices (230) and (240) via the network (250). Each terminal device of the terminal devices (230) and (240) also may receive the coded video data transmitted by the other terminal device of the terminal devices (230) and (240), and may decode the coded video data to recover the video pictures and may display video pictures at an accessible display device according to the recovered video data.

In the FIG. 2 example, the terminal devices (210), (220), (230) and (240) may be illustrated as servers, personal computers and smart phones but the principles of the present disclosure may be not so limited. Embodiments of the present disclosure find application with laptop computers, tablet computers, media players and/or dedicated video conferencing equipment. The network (250) represents any number of networks that convey coded video data among the terminal devices (210), (220), (230) and (240), including for example wireline (wired) and/or wireless communication networks. The communication network (250) may exchange data in circuit-switched and/or packet-switched channels. Representative networks include telecommunications networks, local area networks, wide area networks and/or the Internet. For the purposes of the present discussion, the architecture and topology of the network (250) may be immaterial to the operation of the present disclosure unless explained herein below.

Figure 3:
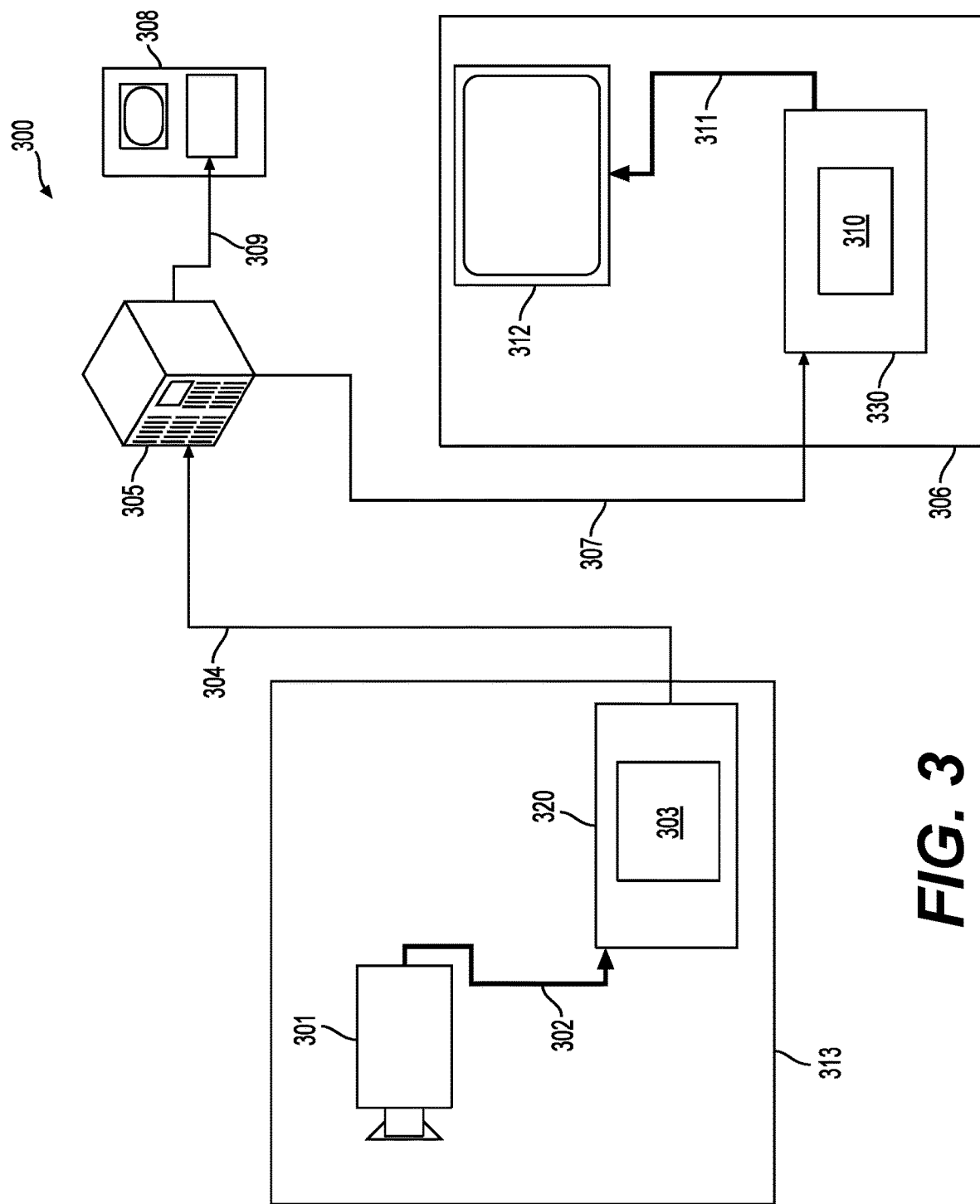
FIG. 3 is a schematic illustration of a simplified block diagram of a communication system (300) in accordance with an embodiment.

FIG. 3 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (313), that can include a video source (301), for example a digital camera, creating for example a stream of video pictures (302) that are uncompressed. In an example, the stream of video pictures (302) includes samples that are taken by the digital camera. The stream of video pictures (302), depicted as a bold line to emphasize a high data volume when compared to encoded video data (304) (or coded video bitstreams), can be processed by an electronic device (320) that includes a video encoder (303) coupled to the video source (301). The video encoder (303) can include hardware, software, or a combination thereof to enable or implement aspects of the disclosed subject matter as described in more detail below. The encoded video data (304) (or encoded video bitstream (304)), depicted as a thin line to emphasize the lower data volume when compared to the stream of video pictures (302), can be stored on a streaming server (305) for future use. One or more streaming client subsystems, such as client subsystems (306) and (308) in FIG. 3 can access the streaming server (305) to retrieve copies (307) and (309) of the encoded video data (304). A client subsystem (306) can include a video decoder (310), for example, in an electronic device (330). The video decoder (310) decodes the incoming copy (307) of the encoded video data and creates an outgoing stream of video pictures (311) that can be rendered on a display (312) (e.g., display screen) or other rendering device (not depicted). In some streaming systems, the encoded video data (304), (307), and (309) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (320) and (330) can include other components (not shown). For example, the electronic device (320) can include a video decoder (not shown) and the electronic device (330) can include a video encoder (not shown) as well.

Figure 4:
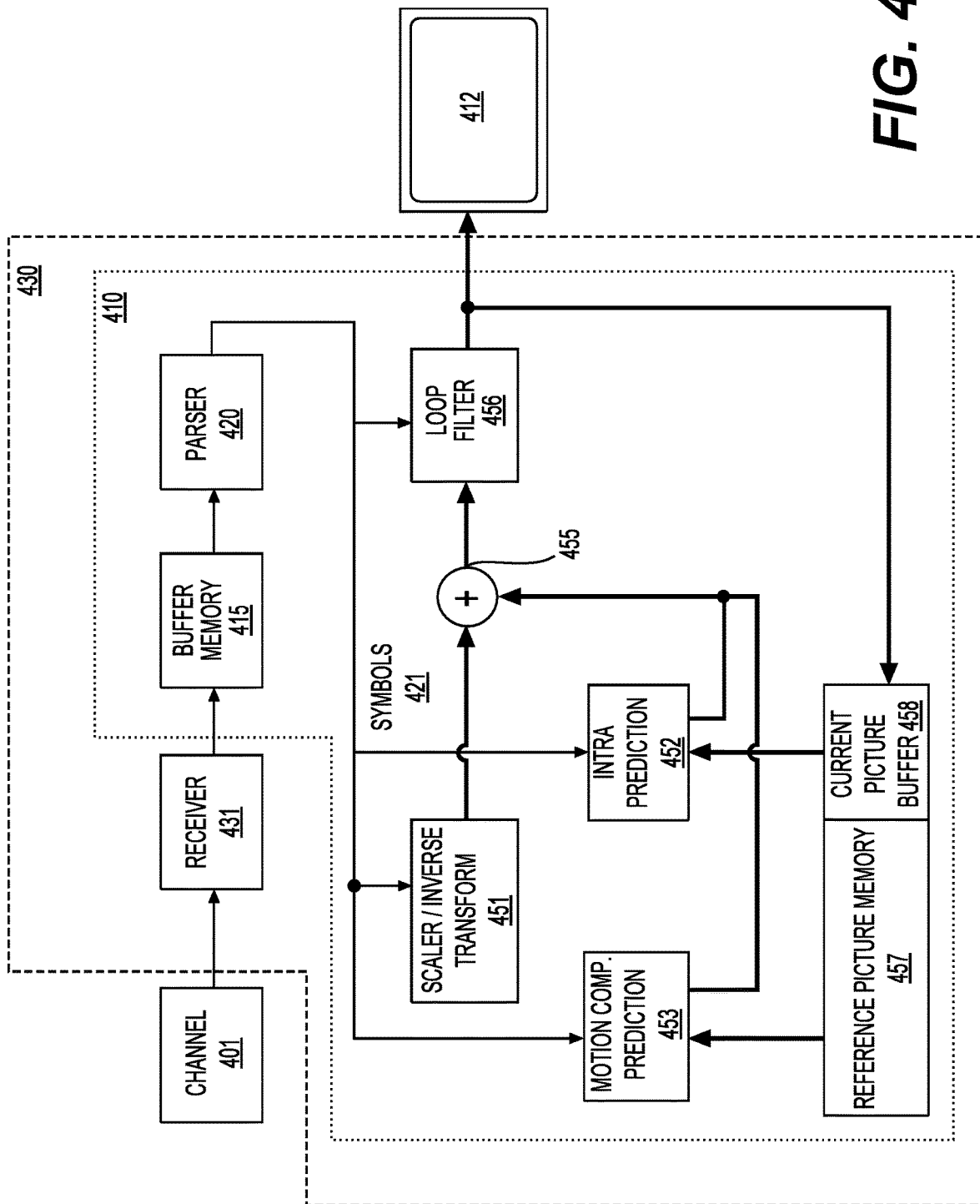
FIG. 4 is a schematic illustration of a simplified block diagram of a decoder in accordance with an embodiment.

FIG. 4 shows a block diagram of a video decoder (410) according to an embodiment of the present disclosure. The video decoder (410) can be included in an electronic device (430). The electronic device (430) can include a receiver (431) (e.g., receiving circuitry). The video decoder (410) can be used in the place of the video decoder (310) in the FIG. 3 example.

The receiver (431) may receive one or more coded video sequences to be decoded by the video decoder (410); in the same or another embodiment, one coded video sequence at a time, where the decoding of each coded video sequence is independent from other coded video sequences. The coded video sequence may be received from a channel (401), which may be a hardware/software link to a storage device which stores the encoded video data. The receiver (431) may receive the encoded video data with other data, for example, coded audio data and/or ancillary data streams, that may be forwarded to their respective using entities (not depicted). The receiver (431) may separate the coded video sequence from the other data. To combat network jitter, a buffer memory (415) may be coupled in between the receiver (431) and an entropy decoder/parser (420) ("parser (420)" henceforth). In certain applications, the buffer memory (415) is part of the video decoder (410). In others, it can be outside of the video decoder (410) (not depicted). In still others, there can be a buffer memory (not depicted) outside of the video decoder (410), for example to combat network jitter, and in addition another buffer memory (415) inside the video decoder (410), for example to handle playout timing. When the receiver (431) is receiving data from a store/forward device of sufficient bandwidth and controllability, or from an isosynchronous network, the buffer memory (415) may not be needed, or can be small. For use on best effort packet networks such as the Internet, the buffer memory (415) may be required, can be comparatively large and can be advantageously of adaptive size, and may at least partially be implemented in an operating system or similar elements (not depicted) outside of the video decoder (410).

The video decoder (410) may include the parser (420) to reconstruct symbols (421) from the coded video sequence. Categories of those symbols include information used to manage operation of the video decoder (410), and potentially information to control a rendering device such as a render device (412) (e.g., a display screen) that is not an integral part of the electronic device (430) but can be coupled to the electronic device (430), as was shown in FIG. 4. The control information for the rendering device(s) may be in the form of Supplemental Enhancement Information (SEI messages) or Video Usability Information (VUI) parameter set fragments (not depicted). The parser (420) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (420) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (420) may also extract from the coded video sequence information such as transform coefficients, quantizer parameter values, motion vectors, and so forth.

The parser (420) may perform an entropy decoding/parsing operation on the video sequence received from the buffer memory (415), so as to create symbols (421).

Reconstruction of the symbols (421) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (420). The flow of such subgroup control information between the parser (420) and the multiple units below is not depicted for clarity.

Beyond the functional blocks already mentioned, the video decoder (410) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (451). The scaler/inverse transform unit (451) receives a quantized transform coefficient as well as control information, including which transform to use, block size, quantization factor, quantization scaling matrices, etc. as symbol(s) (421) from the parser (420). The scaler/inverse transform unit (451) can output blocks comprising sample values, that can be input into aggregator (455).

In some cases, the output samples of the scaler/inverse transform (451) can pertain to an intra coded block; that is: a block that is not using predictive information from previously reconstructed pictures, but can use predictive information from previously reconstructed parts of the current picture. Such predictive information can be provided by an intra picture prediction unit (452). In some cases, the intra picture prediction unit (452) generates a block of the same size and shape of the block under reconstruction, using surrounding already reconstructed information fetched from the current picture buffer (458). The current picture buffer (458) buffers, for example, partly reconstructed current picture and/or fully reconstructed current picture. The aggregator (455), in some cases, adds, on a per sample basis, the prediction information the intra prediction unit (452) has generated to the output sample information as provided by the scaler/inverse transform unit (451).

In other cases, the output samples of the scaler/inverse transform unit (451) can pertain to an inter coded, and potentially motion compensated block. In such a case, a motion compensation prediction unit (453) can access reference picture memory (457) to fetch samples used for prediction. After motion compensating the fetched samples in accordance with the symbols (421) pertaining to the block, these samples can be added by the aggregator (455) to the output of the scaler/inverse transform unit (451) (in this case called the residual samples or residual signal) so as to generate output sample information. The addresses within the reference picture memory (457) from where the motion compensation prediction unit (453) fetches prediction samples can be controlled by motion vectors, available to the motion compensation prediction unit (453) in the form of symbols (421) that can have, for example X, Y, and reference picture components. Motion compensation also can include interpolation of sample values as fetched from the reference picture memory (457) when sub-sample exact motion vectors are in use, motion vector prediction mechanisms, and so forth.

The output samples of the aggregator (455) can be subject to various loop filtering techniques in the loop filter unit (456). Video compression technologies can include in-loop filter technologies that are controlled by parameters included in the coded video sequence (also referred to as coded video bitstream) and made available to the loop filter unit (456) as symbols (421) from the parser (420), but can also be responsive to meta-information obtained during the decoding of previous (in decoding order) parts of the coded picture or coded video sequence, as well as responsive to previously reconstructed and loop-filtered sample values.

The output of the loop filter unit (456) can be a sample stream that can be output to the render device (412) as well as stored in the reference picture memory (457) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (420)), the current picture buffer (458) can become a part of the reference picture memory (457), and a fresh current picture buffer can be reallocated before commencing the reconstruction of the following coded picture.

The video decoder (410) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (431) may receive additional (redundant) data with the encoded video. The additional data may be included as part of the coded video sequence(s). The additional data may be used by the video decoder (410) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 5:
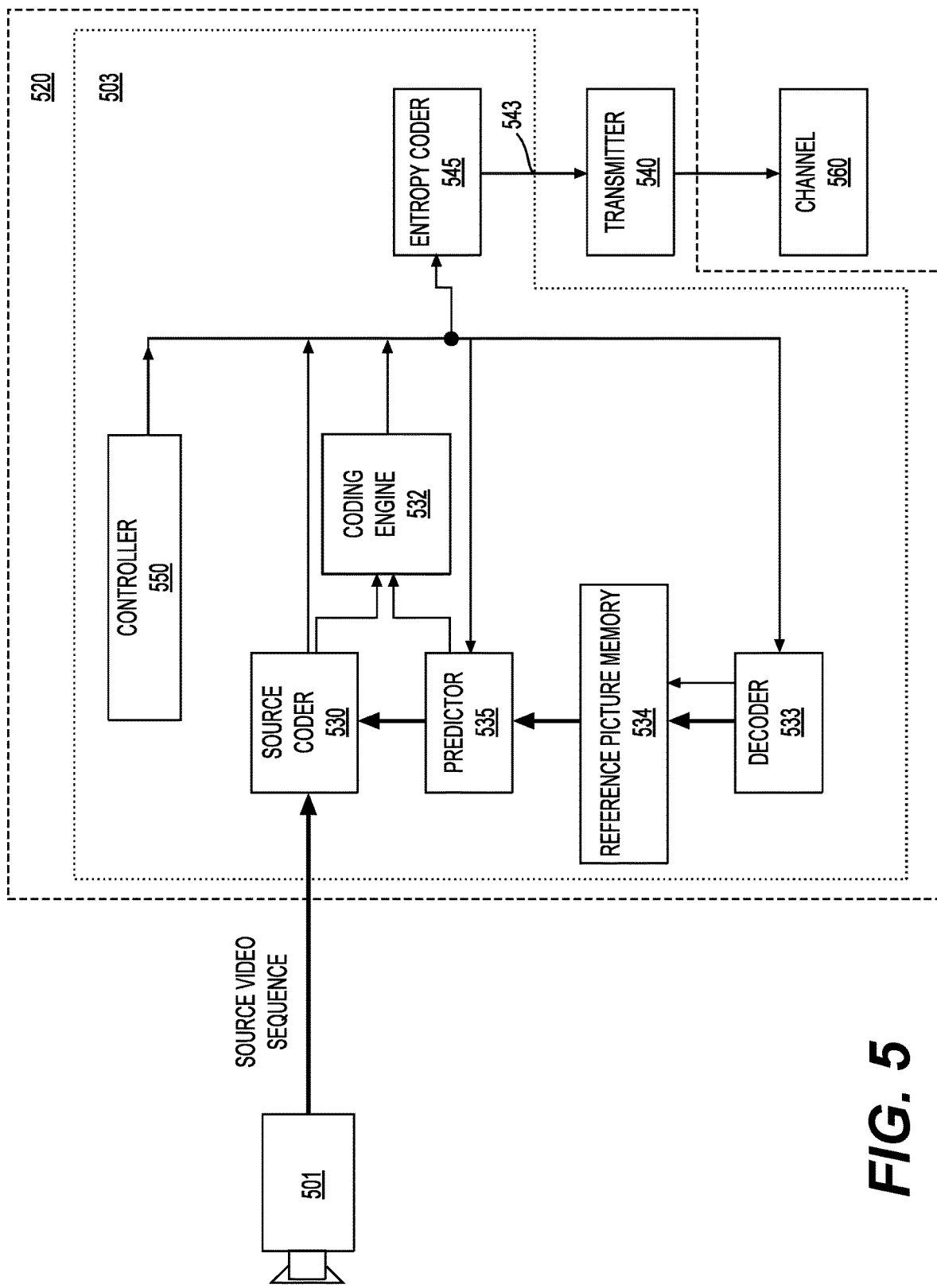
FIG. 5 is a schematic illustration of a simplified block diagram of an encoder in accordance with an embodiment.

FIG. 5 shows a block diagram of a video encoder (503) according to an embodiment of the present disclosure. The video encoder (503) is included in an electronic device (520). The electronic device (520) includes a transmitter (540) (e.g., transmitting circuitry). The video encoder (503) can be used in the place of the video encoder (303) in the FIG. 3 example.

The video encoder (503) may receive video samples from a video source (501) (that is not part of the electronic device (520) in the FIG. 5 example) that may capture video image(s) to be coded by the video encoder (503). In another example, the video source (501) is a part of the electronic device (520).

The video source (501) may provide the source video sequence to be coded by the video encoder (503) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (501) may be a storage device storing previously prepared video. In a videoconferencing system, the video source (501) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (503) may code and compress the pictures of the source video sequence into a coded video sequence (543) in real time or under any other time constraints as required by the application. Enforcing appropriate coding speed is one function of a controller (550). In some embodiments, the controller (550) controls other functional units as described below and is functionally coupled to the other functional units. The coupling is not depicted for clarity. Parameters set by the controller (550) can include rate control related parameters (picture skip, quantizer, lambda value of rate-distortion optimization techniques, . . . ), picture size, group of pictures (GOP) layout, maximum motion vector search range, and so forth. The controller (550) can be configured to have other suitable functions that pertain to the video encoder (503) optimized for a certain system design.

In some embodiments, the video encoder (503) is configured to operate in a coding loop. As an oversimplified description, in an example, the coding loop can include a source coder (530) (e.g., responsible for creating symbols, such as a symbol stream, based on an input picture to be coded, and a reference picture(s)), and a (local) decoder (533) embedded in the video encoder (503). The decoder (533) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (534). As the decoding of a symbol stream leads to bit-exact results independent of decoder location (local or remote), the content in the reference picture memory (534) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (533) can be the same as of a "remote" decoder, such as the video decoder (410), which has already been described in detail above in conjunction with FIG. 4. Briefly referring also to FIG. 4, however, as symbols are available and encoding/decoding of symbols to a coded video sequence by an entropy coder (545) and the parser (420) can be lossless, the entropy decoding parts of the video decoder (410), including the buffer memory (415), and parser (420) may not be fully implemented in the local decoder (533).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (530) may perform motion compensated predictive coding, which codes an input picture predictively with reference to one or more previously-coded picture from the video sequence that were designated as "reference pictures". In this manner, the coding engine (532) codes differences between pixel blocks of an input picture and pixel blocks of reference picture(s) that may be selected as prediction reference(s) to the input picture.

The local video decoder (533) may decode coded video data of pictures that may be designated as reference pictures, based on symbols created by the source coder (530). Operations of the coding engine (532) may advantageously be lossy processes. When the coded video data may be decoded at a video decoder (not shown in FIG. 5), the reconstructed video sequence typically may be a replica of the source video sequence with some errors. The local video decoder (533) replicates decoding processes that may be performed by the video decoder on reference pictures and may cause reconstructed reference pictures to be stored in the reference picture cache (534). In this manner, the video encoder (503) may store copies of reconstructed reference pictures locally that have common content as the reconstructed reference pictures that will be obtained by a far-end video decoder (absent transmission errors).

The predictor (535) may perform prediction searches for the coding engine (532). That is, for a new picture to be coded, the predictor (535) may search the reference picture memory (534) for sample data (as candidate reference pixel blocks) or certain metadata such as reference picture motion vectors, block shapes, and so on, that may serve as an appropriate prediction reference for the new pictures. The predictor (535) may operate on a sample block-by-pixel block basis to find appropriate prediction references. In some cases, as determined by search results obtained by the predictor (535), an input picture may have prediction references drawn from multiple reference pictures stored in the reference picture memory (534).

The controller (550) may manage coding operations of the source coder (530), including, for example, setting of parameters and subgroup parameters used for encoding the video data.

Output of all aforementioned functional units may be subjected to entropy coding in the entropy coder (545). The entropy coder (545) translates the symbols as generated by the various functional units into a coded video sequence, by losslessly compressing the symbols according to technologies such as Huffman coding, variable length coding, arithmetic coding, and so forth.

The transmitter (540) may buffer the coded video sequence(s) as created by the entropy coder (545) to prepare for transmission via a communication channel (560), which may be a hardware/software link to a storage device which would store the encoded video data. The transmitter (540) may merge coded video data from the video coder (503) with other data to be transmitted, for example, coded audio data and/or ancillary data streams (sources not shown).

The controller (550) may manage operation of the video encoder (503). During coding, the controller (550) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (503) may perform coding operations according to a predetermined video coding technology or standard, such as ITU-T Rec. H.265. In its operation, the video encoder (503) may perform various compression operations, including predictive coding operations that exploit temporal and spatial redundancies in the input video sequence. The coded video data, therefore, may conform to a syntax specified by the video coding technology or standard being used.

In an embodiment, the transmitter (540) may transmit additional data with the encoded video. The source coder (530) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 6:
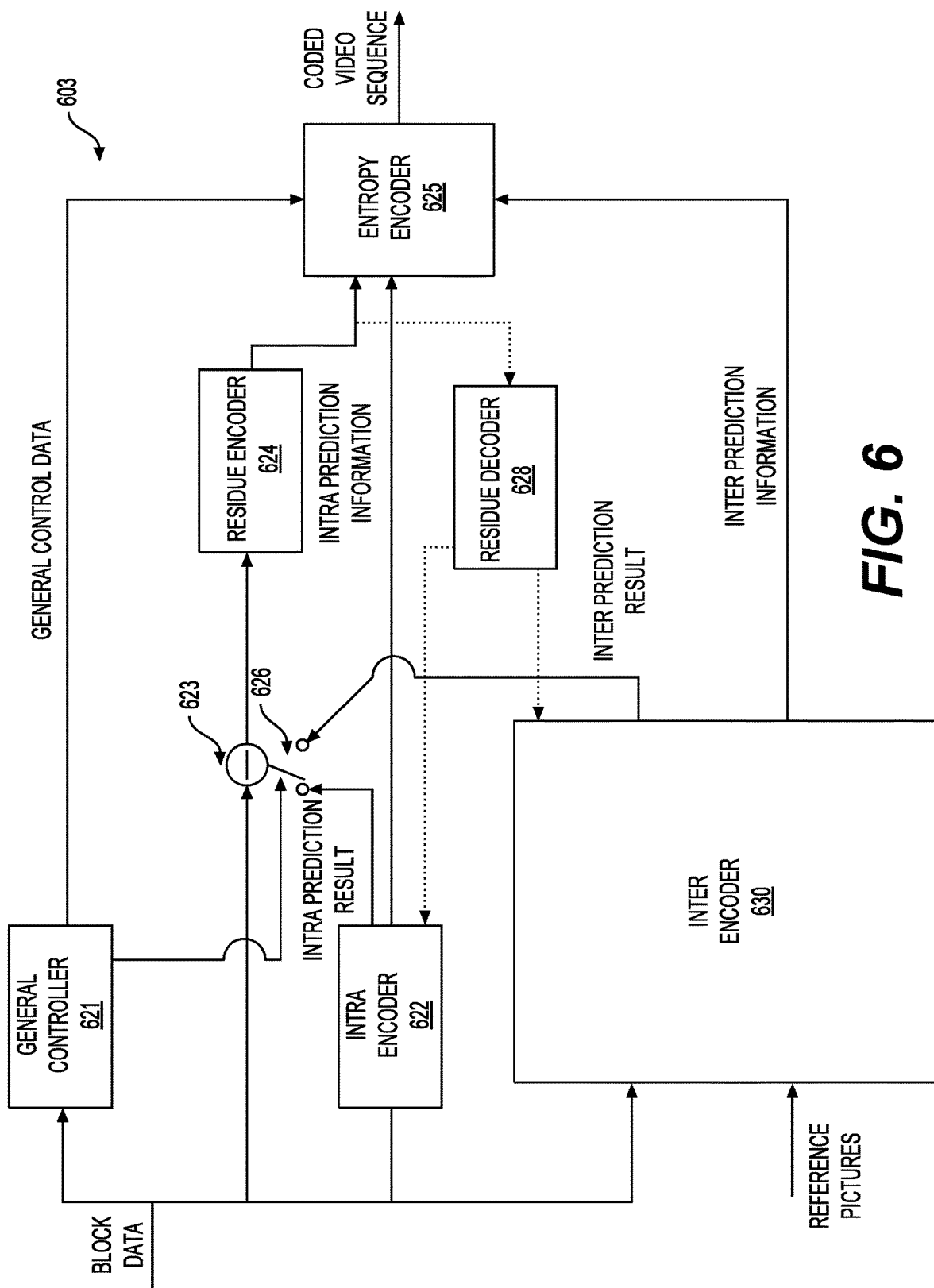
FIG. 6 shows a block diagram of an encoder in accordance with another embodiment.

FIG. 6 shows a diagram of a video encoder (603) according to another embodiment of the disclosure. The video encoder (603) is configured to receive a processing block (e.g., a prediction block) of sample values within a current video picture in a sequence of video pictures, and encode the processing block into a coded picture that is part of a coded video sequence. In an example, the video encoder (603) is used in the place of the video encoder (303) in the FIG. 3 example.

In an HEVC example, the video encoder (603) receives a matrix of sample values for a processing block, such as a prediction block of 8×8 samples, and the like. The video encoder (603) determines whether the processing block is best coded using intra mode, inter mode, or bi-prediction mode using, for example, rate-distortion optimization. When the processing block is to be coded in intra mode, the video encoder (603) may use an intra prediction technique to encode the processing block into the coded picture; and when the processing block is to be coded in inter mode or bi-prediction mode, the video encoder (603) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (603) includes other components, such as a mode decision module (not shown) to determine the mode of the processing blocks.

In the FIG. 6 example, the video encoder (603) includes the inter encoder (630), an intra encoder (622), a residue calculator (623), a switch (626), a residue encoder (624), a general controller (621), and an entropy encoder (625) coupled together as shown in FIG. 6.

The inter encoder (630) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (622) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (622) also calculates intra prediction results (e.g., predicted block) based on the intra prediction information and reference blocks in the same picture.

The general controller (621) is configured to determine general control data and control other components of the video encoder (603) based on the general control data. In an example, the general controller (621) determines the mode of the block, and provides a control signal to the switch (626) based on the mode. For example, when the mode is the intra mode, the general controller (621) controls the switch (626) to select the intra mode result for use by the residue calculator (623), and controls the entropy encoder (625) to select the intra prediction information and include the intra prediction information in the bitstream; and when the mode is the inter mode, the general controller (621) controls the switch (626) to select the inter prediction result for use by the residue calculator (623), and controls the entropy encoder (625) to select the inter prediction information and include the inter prediction information in the bitstream.

The residue calculator (623) is configured to calculate a difference (residue data) between the received block and prediction results selected from the intra encoder (622) or the inter encoder (630). The residue encoder (624) is configured to operate based on the residue data to encode the residue data to generate the transform coefficients. In an example, the residue encoder (624) is configured to convert the residue data from a spatial domain to a frequency domain, and generate the transform coefficients. The transform coefficients are then subject to quantization processing to obtain quantized transform coefficients. In various embodiments, the video encoder (603) also includes a residue decoder (628). The residue decoder (628) is configured to perform inverse-transform, and generate the decoded residue data. The decoded residue data can be suitably used by the intra encoder (622) and the inter encoder (630). For example, the inter encoder (630) can generate decoded blocks based on the decoded residue data and inter prediction information, and the intra encoder (622) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (625) is configured to format the bitstream to include the encoded block. The entropy encoder (625) is configured to include various information according to a suitable standard, such as the HEVC standard. In an example, the entropy encoder (625) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 7:
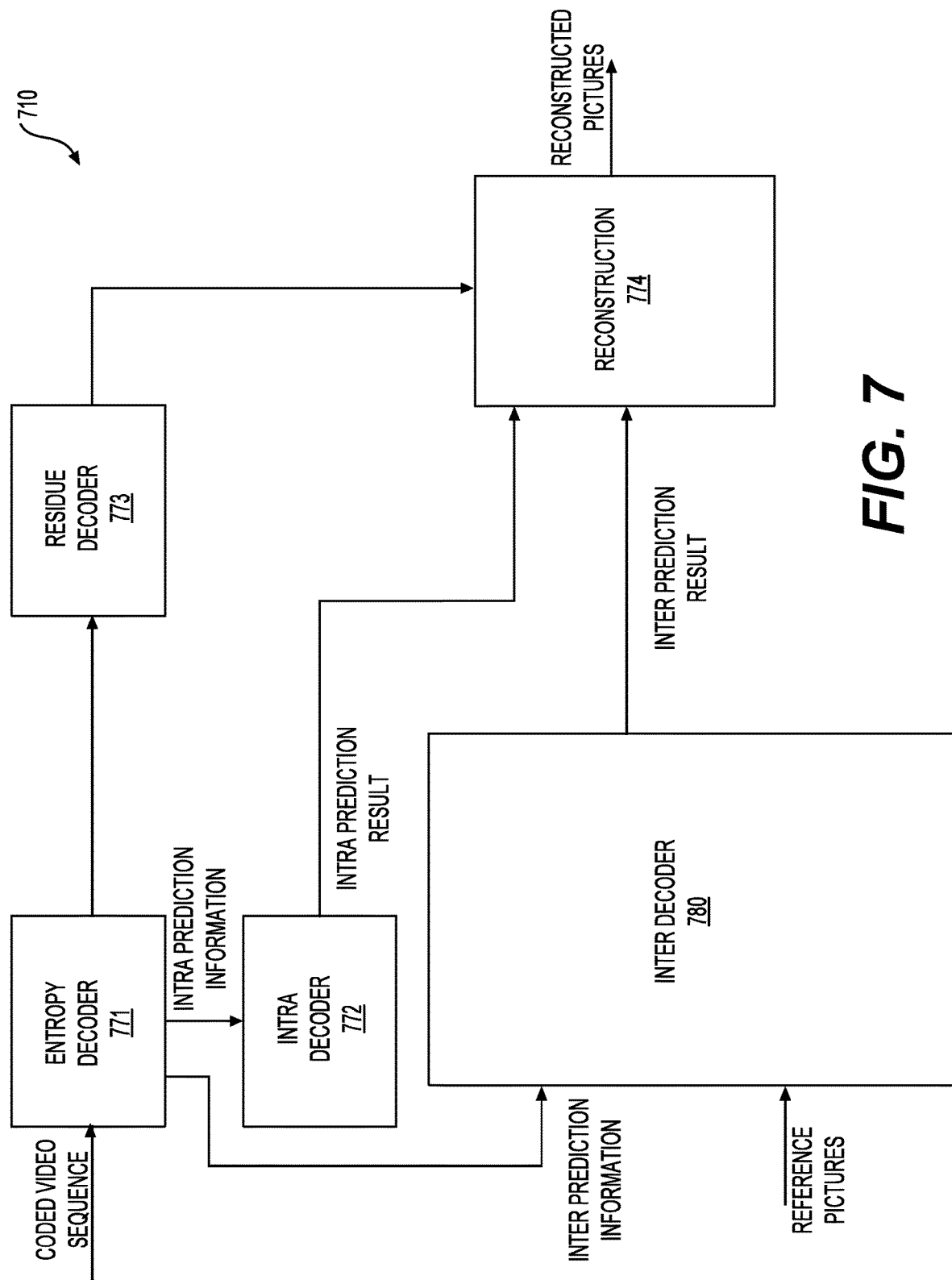
FIG. 7 shows a block diagram of a decoder in accordance with another embodiment.

FIG. 7 shows a diagram of a video decoder (710) according to another embodiment of the disclosure. The video decoder (710) is configured to receive coded pictures that are part of a coded video sequence, and decode the coded pictures to generate reconstructed pictures. In an example, the video decoder (710) is used in the place of the video decoder (310) in the FIG. 3 example.

In the FIG. 7 example, the video decoder (710) includes an entropy decoder (771), an inter decoder (780), a residue decoder (773), a reconstruction module (774), and an intra decoder (772) coupled together as shown in FIG. 7.

The entropy decoder (771) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (772) or the inter decoder (780), respectively, residual information in the form of, for example, quantized transform coefficients, and the like. In an example, when the prediction mode is inter or bi-predicted mode, the inter prediction information is provided to the inter decoder (780); and when the prediction type is the intra prediction type, the intra prediction information is provided to the intra decoder (772). The residual information can be subject to inverse quantization and is provided to the residue decoder (773).

The inter decoder (780) is configured to receive the inter prediction information, and generate inter prediction results based on the inter prediction information.

The intra decoder (772) is configured to receive the intra prediction information, and generate prediction results based on the intra prediction information.

The residue decoder (773) is configured to perform inverse quantization to extract de-quantized transform coefficients, and process the de-quantized transform coefficients to convert the residual from the frequency domain to the spatial domain. The residue decoder (773) may also require certain control information (to include the Quantizer Parameter (QP)), and that information may be provided by the entropy decoder (771) (data path not depicted as this may be low volume control information only).

The reconstruction module (774) is configured to combine, in the spatial domain, the residual as output by the residue decoder (773) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (303), (503), and (603), and the video decoders (310), (410), and (710) can be implemented using any suitable technique. In an embodiment, the video encoders (303), (503), and (603), and the video decoders (310), (410), and (710) can be implemented using one or more integrated circuits. In another embodiment, the video encoders (303), (503), and (503), and the video decoders (310), (410), and (710) can be implemented using one or more processors that execute software instructions.

Aspects of the disclosure provide techniques for handling sub-block based merge mode with offsets.

In video codec, merge mode is used in inter-picture prediction (inter prediction). In some embodiments, when a merge flag (including skip flag) is signaled as true, a merge index is then signaled to indicate which candidate in a merge candidate list is used to indicate the motion vectors of the current block. At the decoder side, a merge candidate list is constructed based on spatial and temporal neighbors of the current block. In some examples, up to four spatially neighboring MVs, such as the MVs of the positions A1, B1, B0, A0 and B2 in FIG. 1 example, are added into merge candidate lists. In addition, up to one MV from temporal neighbors on the current block is added to the list. Additional merge candidates that include combined bi-predictive candidates and zero motion vector candidates can be added into the merge candidate lists.

In some examples, before taking the motion information of a block as a merge candidate, the redundancy checks are performed to check whether the motion information is identical to an element in the current merge candidate list. If when the motion information is different from each element in the current merge candidate list, the motion information can be added to the merge candidate list as a merge candidate.

In some example, a parameter MaxMergeCandsNum that defines the maximum number of merge candidates can be signaled in the coded video bitstream.

In some embodiments, affine merge prediction is used in video codec, and the mode that uses the affine merge prediction is reference to as AF_MERGE mode. In an example, AF_MERGE mode can be applied for CUs with both width and height larger than or equal to 8. In the AF_MERGE mode, the control point motion vectors (CPMVs) of the current CU are generated based on the motion information of the spatial neighboring CUs. In an example, there can be up to five CPMVP candidates and an index is signalled to indicate the one to be used for the current CU. In an example, three types of CPVM candidates are used to form the affine merge candidate list. The first type of CPMV candidates is inherited affine merge candidates that extrapolated from the CPMVs of the neighbour CUs. The second type of CPMV candidates are constructed affine merge candidates CPMVPs that are derived using the translational MVs of the neighbour CUs. The third type of CPMV candidates is Zero MVs.

Figure 1:
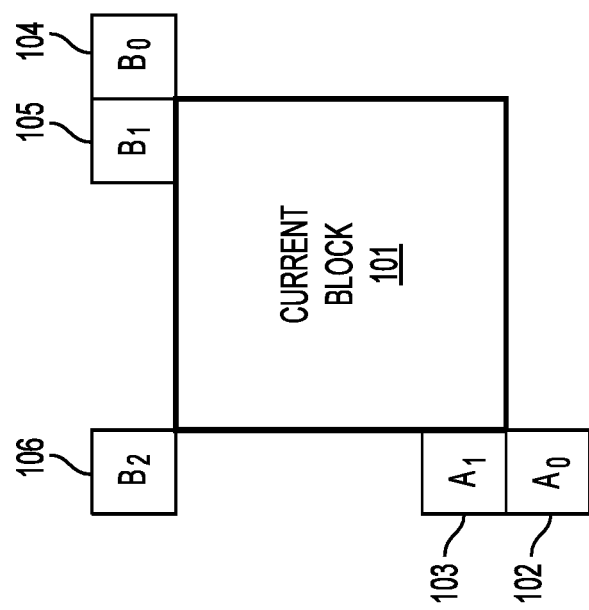
FIG. 1 is a schematic illustration of a current block and its surrounding spatial merge candidates in one example.

In some examples, such as in VTM3, a maximum of two inherited affine candidates can be used. In an example, two inherited affine candidates are derived from affine motion models of the neighboring blocks, one from left neighboring CUs (referred to as left predictor) and one from above neighboring CUs (referred to as above predictor). Referring to FIG. 1, in some examples, for the left predictor, the scan order is A0→A1, and for the above predictor, the scan order is B0→B1→B2. In an example, only the first inherited candidate from each side is selected. In some examples, no pruning check is performed between two inherited candidates. When a neighboring affine CU is identified, the control point motion vectors of the neighboring affine CU are used to derive the CPMVP candidate in the affine merge list of the current CU.

Figure 8:
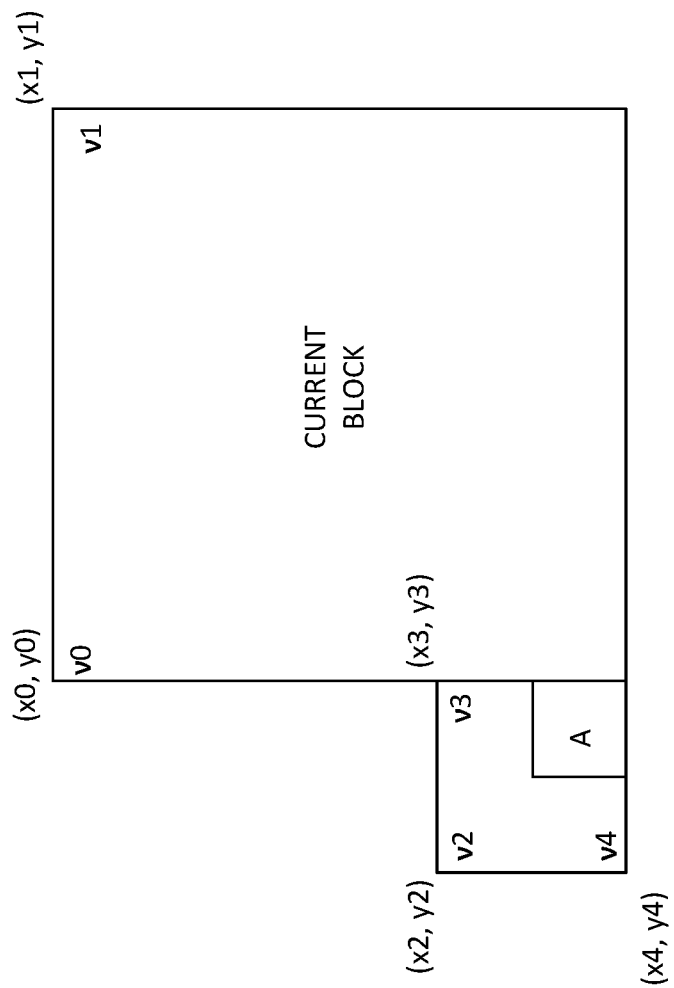
FIG. 8 shows an example for affine merge mode.

FIG. 8 shows an example for affine merge mode. As shown in FIG. 8, when the neighbour left bottom block A is coded in affine mode, the motion vectors $v_2$, $v_3$ and $v_4$ of the top left corner, above right corner and left bottom corner of a CU which contains the block A are attained. When block A is coded with 4-parameter affine model, the two CPMVs of the current CU are calculated according to $v_2$, and $v_3$. In case that block A is coded with 6-parameter affine model, the three CPMVs of the current CU are calculated according to $v_2$, $v_3$ and $v_4$.

In some examples, a constructed affine candidate is constructed by combining the neighbor translational motion information of each control point. The motion information for the control points can be derived from the specified spatial neighbors and temporal neighbor.

Figure 9:
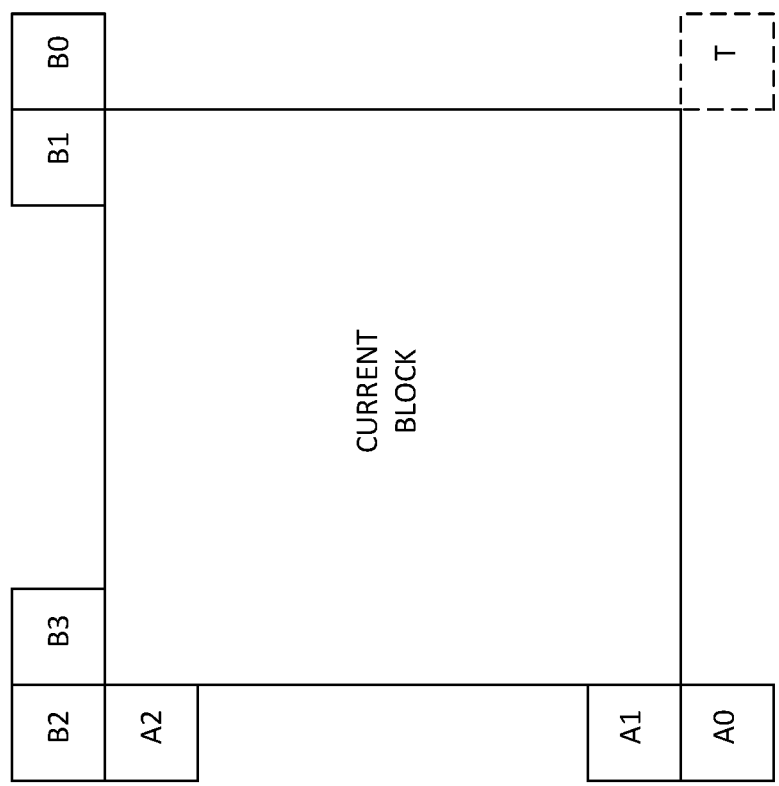
FIG. 9 shows an example of spatial neighbors and temporal neighbor according to some embodiments of the disclosure

FIG. 9 shows an example of spatial neighbors (e.g., A0-A2 and B0-B3) and temporal neighbor (e.g., T) according to some embodiments of the disclosure. In an example, $CPMV_k$ (k=1, 2, 3, 4) represents the k-th control point. For $CPMV_1$, the B2→B3→A2 blocks are checked (→ is used for checking order) and the MV of the first available block is used. For $CPMV_2$, the B1→B0 blocks are checked and for $CPMV_3$, the A1→A0 blocks are checked. For TMVP, T is checked and is used as $CPMV_4$ if the MV of the block T is available.

After MVs of four control points are attained, affine merge candidates are constructed based on that motion information. The following combinations of control point MVs are used to construct in order: $\{CPMV_1, CPMV_2, CPMV_3\}$, $\{CPMV_1, CPMV_2, CPMV_4\}$, $\{CPMV_1, CPMV_3, CPMV_4\}$, $\{CPMV_2, CPMV_3, CPMV_4\}$, $\{CPMV_1, CPMV_2\}$, $\{CPMV_1, CPMV_3\}$.

The combination of 3 CPMVs can construct a 6-parameter affine merge candidate and the combination of 2 CPMVs can construct a 4-parameter affine merge candidate. In an example, to avoid motion scaling process, when the reference indices of control points are different, the related combination of control point MVs can be discarded.

In an example, after inherited affine merge candidates and constructed affine merge candidate are checked, if a candidate list is still not full, zero MVs are inserted to the end of the list.

In some examples, the subblock-based temporal motion vector prediction (SbTMVP) can be used in VTM. Similar to the temporal motion vector prediction (TMVP) in HEVC, SbTMVP uses the motion field in the collocated picture to improve motion vector prediction and merge mode for CUs in the current picture. In some examples, the same collocated picture used by TMVP is used for SbTVMP. SbTMVP differs from TMVP in two aspects. In the first aspect, TMVP predicts motion at CU level but SbTMVP predicts motion at sub-CU level. In the second aspect, TMVP fetches the temporal motion vectors from the collocated block in the collocated picture (the collocated block is the bottom-right or center block relative to the current CU), SbTMVP applies a motion shift before fetching the temporal motion information from the collocated picture. The motion shift is obtained from the motion vector from one of the spatial neighboring blocks of the current CU.

Figure 10:
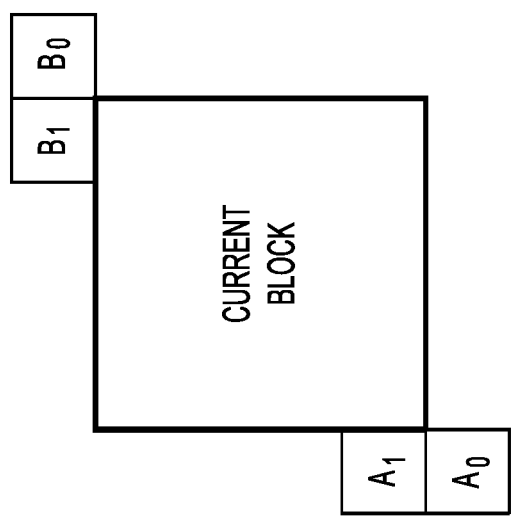
FIGS. 10-11 show an example of a SbTVMP process according to some embodiments of the disclosure.
Figure 11:
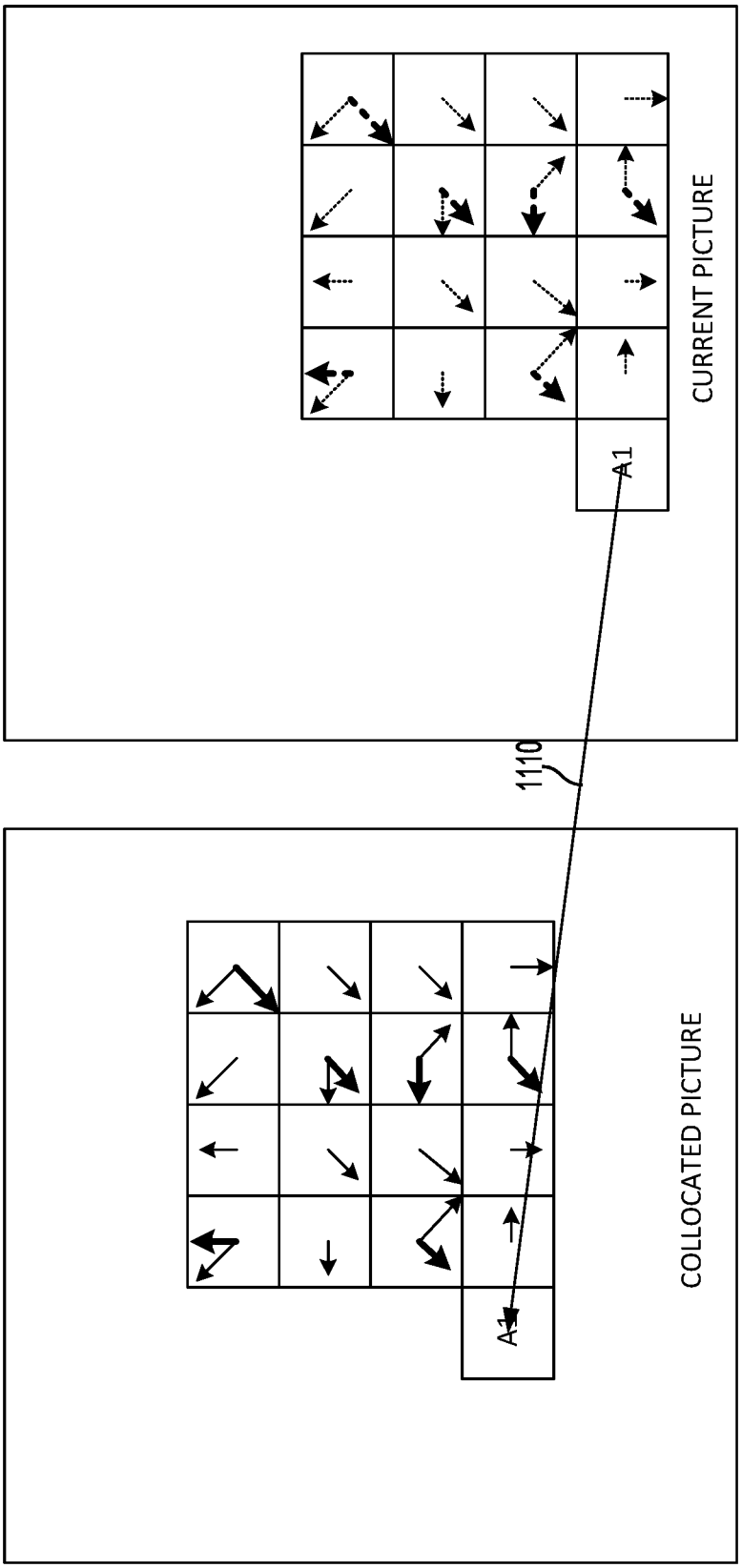

FIGS. 10-11 show an example of a SbTVMP process according to some embodiments of the disclosure. SbTMVP predicts the motion vectors of the sub-CUs within the current CU in two steps. In the first step, the spatial neighbors shown in FIG. 10 are examined in the order of A1, B1, B0 and A0 to identify a first spatial neighboring block that has a motion vector using the collocated picture as its reference picture. Then, the motion vector using the collected picture as its reference picture is selected to be the motion shift to be applied. If no such motion is identified from the spatial neighbors of A1, B1, B0 and A0, then the motion shift is set to (0, 0).

In the second step, the motion shift identified in the first step is applied (i.e. added to the current block's coordinates) to obtain sub-CU-level motion information (motion vectors and reference indices) from the collocated picture as shown in FIG. 11. In the FIG. 11 example, A1's motion vector is set as the motion shift (1110). Then, for each sub-CU, the motion information of the corresponding block (the smallest motion grid that covers the center sample) in the collocated picture is used to derive the motion information for the sub-CU. After the motion information of the collocated sub-CU is identified, it is converted to the motion vectors and reference indices of the current sub-CU in a similar way as the TMVP process of HEVC. For example, temporal motion scaling is applied to align the reference pictures of the temporal motion vectors to those of the current CU.

In some examples, such as in VTM3, a sub-block based merge mode is used. The sub-block based merge mode determines motion information of respective sub-blocks in a current block directly or indirectly based on a merge candidate list of the current block. The motion information of the respective sub-blocks is used to reconstruct the respective sub-blocks of the current block. In some embodiments, the sub-block based merge mode uses a combined sub-block based merge candidate list which includes both SbTVMP candidate and affine merge candidates. The SbTVMP mode is enabled/disabled by a sequence parameter set (SPS) flag. When the SbTMVP mode is enabled, the SbTMVP predictor is added as the first entry of the combined sub-block based merge list, and followed by the affine merge candidates. The maximum allowed size of the sub-block based merge list is 5 in VTM3.

In an example, the sub-CU size used in SbTMVP is fixed to be 8×8, and as done for affine merge mode, SbTMVP mode is only applicable to the CU with both width and height are larger than or equal to 8.

In some embodiments, the encoding logic of the additional SbTMVP merge candidate is the same as for the other merge candidates. In an example, for each CU in P or B slice, an additional rate distortion check is performed to decide whether to use the SbTMVP candidate.

According to the history-based MVP (HMVP) technique, a HMVP candidate is defined as the motion information of a previously coded block. In some embodiments, a table with multiple HMVP candidates is maintained during the encoding/decoding process. For example, the table is emptied at a beginning of a new slice. When there is an inter-coded non-affine block, either in merge/skip mode or AMVP mode with MVD, the associated motion information is added to the last entry of the table as a new HMVP candidate.

During operation in an example using the HMVP technique, a table with HMVP candidates is loaded before decoding a block. Then, the block is decoded with the HMVP candidates in the table. Further, the table is updated with decoded motion information of the block. The updated table can be loaded to decode subsequent blocks.

In some examples, a table size S is set to be a constant value, such as 6, which indicates that up to, for example 6 HMVP candidates, may be added into the table. In an embodiment, the table is implemented following a first-in-first-out (FIFO) rule. Further, at a time to insert a new motion candidate, referred to as a new HMVP candidate, into the table, a constrained FIFO rule is utilized. In some embodiments, the table is implemented using a buffer.

Figure 12:
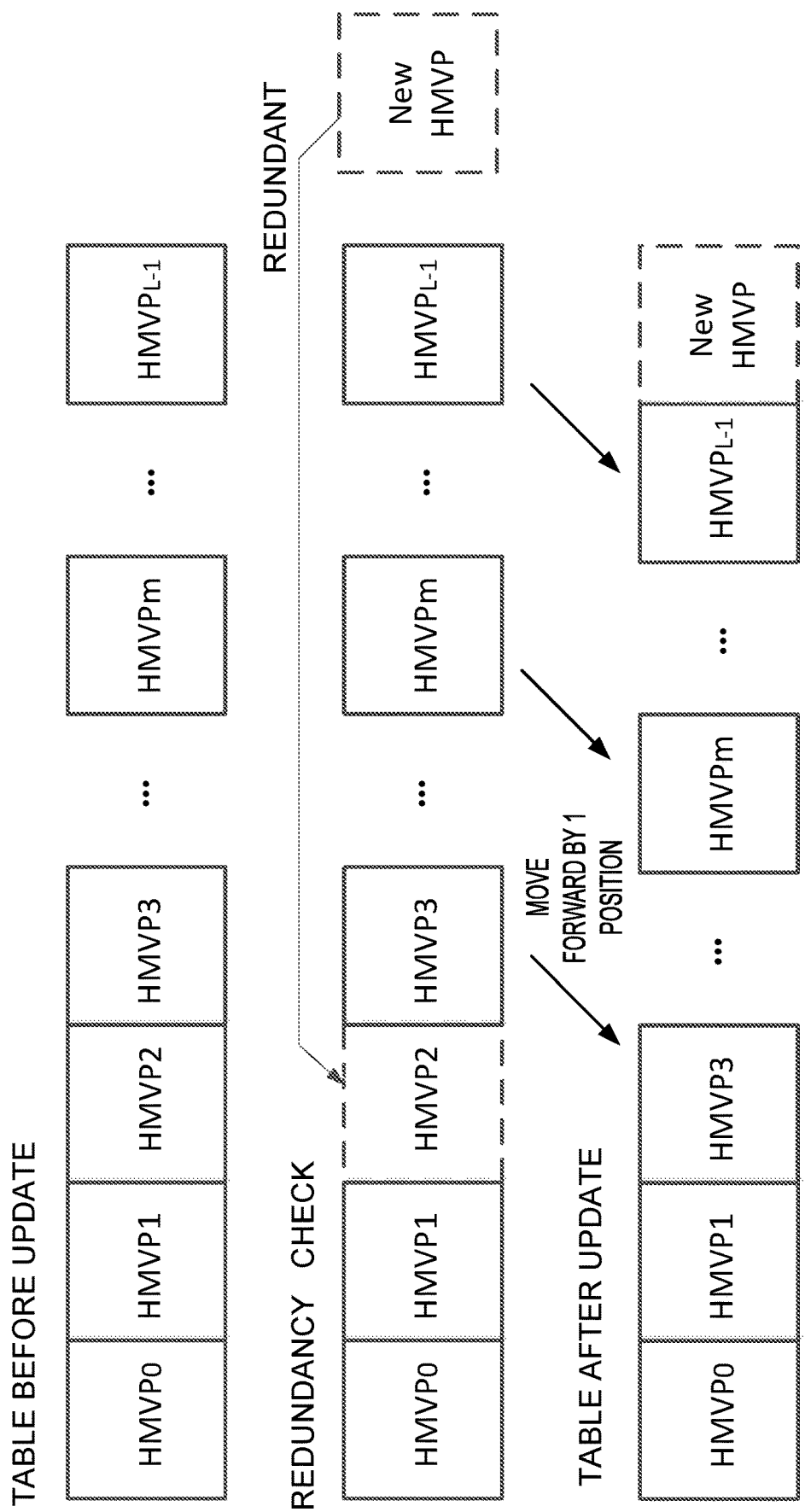
FIG. 12 shows an example of using the constrained FIFO rule to insert a new motion candidate.

FIG. 12 shows an example of using the constrained FIFO rule to insert a new motion candidate. According to the constrained FIFO rule, a redundancy check is applied to determine whether the table includes an identical HMVP candidate to the new HMVP candidate. When an identical HMVP candidate, such as $HMVP_2$ shown in FIG. 10, is found, the identical HMVP candidate is removed from the table and all the HMVP candidates afterwards are moved forward by 1 position, and the new HMVP candidate is added at the end (the latest position) of the table.

In some embodiments, HMVP candidates are used in the merge candidate list construction process. In an example, the latest several HMVP candidates in the table are checked in order (from the latest to older ones) and inserted to the candidate list after the temporal motion vector prediction (TMVP) candidate. It is noted that, in an example, a pruning operation is applied on the HMVP candidates with regard to the spatial or temporal merge candidate to exclude sub-block motion candidate (i.e., SbTMVP) of the spatial or temporal merge candidate.

In some examples, to reduce the number of pruning operations, three simplification techniques are used.

In a first simplification technique, the number of HMVP candidates to be checked is denoted by L, and L can be set as (Eq. 1):

$$L=(N<=4)?M:(8-N) \qquad (Eq. 1)$$

where N denotes the number of available non-sub block merge candidates and M denotes the number of available HMVP candidates in the table.

In a second simplification technique, the maximum number MM of allowed merge candidates is signaled. Then, once the total number of available merge candidates reaches (MM−1), the merge candidate list construction process from HMVP list is terminated.

In a third simplification technique, the number of pairs for combined bi-predictive merge candidate derivation is reduced from 12 to 6.

In some embodiments, HMVP candidates are used in the AMVP candidate list construction process in a similar manner. In some examples, the motion vectors of the last K HMVP candidates in the table are inserted after the temporal motion vector prediction (TMVP) candidate. In some examples, only HMVP candidates with the same reference picture as the AMVP target reference picture are used to construct the AMVP candidate list. Pruning is applied on the HMVP candidates. In an AMVP candidate list construction example, K is set to 4 while the AMVP list size is kept unchanged, i.e., equal to 2.

In some embodiments, separate buffers are used for the history-based block vectors and history-based motion vectors. For example, the previously coded IBC block vectors may be stored in a separate buffer (referred as IBC HBVP buffer), different from the one used for storing previously coded MVs (referred as HMVP buffer). These stored BVs can be used to as BV predictors for the current block coded in IBC mode. The usage of HBVP buffer is similar as HMVP for inter coded blocks, such as, update process, pruning, and the placement of previous coded vectors in the merge/skip list or AMVP predictor list.

According to another aspect of the disclosure, a pairwise average technique is used in construction of a merge candidate list. In an example, merge candidates are generated by averaging predefined pairs of candidates in the current merge candidate list. For example, when the current merge candidate list has four candidates that are represented by indices 0, 1, 2 and 3, then six predefined pairs are defined as {(0, 1), (0, 2), (1, 2), (0, 3), (1, 3), (2, 3)}. In some examples, the pairwise average of motion vectors is calculated separately for each reference list. In an example, a reference list has two motion vectors, the two motion vectors are averaged to generate the pairwise average even when the two motion vectors point to different reference pictures. In another example, only one motion vector is available in a reference list, then the motion vector is used directly without pairwise average. In another example, when a reference list has no motion vector available, the reference list is kept invalid. The pairwise average candidates replace the combined candidates in some embodiments.

According to some aspects of the disclosure, merge with motion vector difference (MMVD) techniques can be used for either skip or merge modes with a motion vector expression method.

In some embodiments, MMVD re-uses merge candidates. For example, among the merge candidates, a candidate is selected, and is further expanded by a motion vector expression method. In some examples, a simplified signaling method is used to provide the motion vector expression that includes a starting point, and a motion offset including a motion magnitude, and a motion direction.

In some embodiments, MMVD technique uses a merge candidate list in VVC. In some examples, only candidates having default merge type (e.g., MRG_TYPE_DEFAULT_N) are considered for MMVD's expansion.

In some embodiments, a few syntax elements, such as a prediction direction IDX, a base candidate IDX, a distance IDX, a search direction IDX, and the like, are signaled to describe such an offset. For example, the prediction direction IDX is used to indicate which of the prediction directions (temporal prediction direction, e.g., L0 reference direction, L1 reference direction or L0 and L1 reference directions).

The base candidate IDX is used to indicate which of the existing merge candidates is used as the start point (based candidate) to apply the offset, such as the best candidate among candidates in a list, such as shown in Table 1. It is noted that, in an example, when the number of base candidates is equal to 1, the base candidate IDX is not signaled.

TABLE 1

| Base candidate IDX | | | | |
|---|---|---|---|---|
| Base candidate IDX | 0 | 1 | 2 | 3 |
| $N^{th}$ MVP | $1^{st}$ MVP | $2^{nd}$ MVP | $3^{rd}$ MVP | $4^{th}$ MVP |

The distance IDX is motion magnitude information and is used to indicate the pre-defined distance from the starting point information. Table 2 shows an example of the pre-defined distance:

TABLE 2

| Distance IDX | | | | | | | | |
|---|---|---|---|---|---|---|---|---|
| Distance IDX | 0 | 1 | 2 | 3 | 4 | 5 | 6 | 7 |
| Pixel distance | ¼-pel | ½-pel | 1-pel | 2-pel | 4-pel | 8-pel | 16-pel | 32-pel |

The search direction IDX represents the direction of the MVD relative to the starting point. The search direction index can represent one of the four directions as shown in Table 3.

TABLE 3

| Direction IDX | | | | |
|---|---|---|---|---|
| Direction IDX | 00 | 01 | 10 | 11 |
| x-axis | + | − | N/A | N/A |
| y-axis | N/A | N/A | + | − |

In some embodiments, an MMVD flag is signaled right after sending a skip and merge flag. When the skip and merge flag is true, the MMVD flag is parsed. When the MMVD flag is equal to 1, in an example, MMVD syntaxes are parsed. When the MMVD flag is not 1, an AFFINE flag is parsed. When the AFFINE flag is equal to 1, the AFFINE mode is used for reconstruction. However, if the AFFINE flag is not 1, in an example, skip/merge index is parsed for VVC test model (VTM) skip/merge mode.

Figure 13:
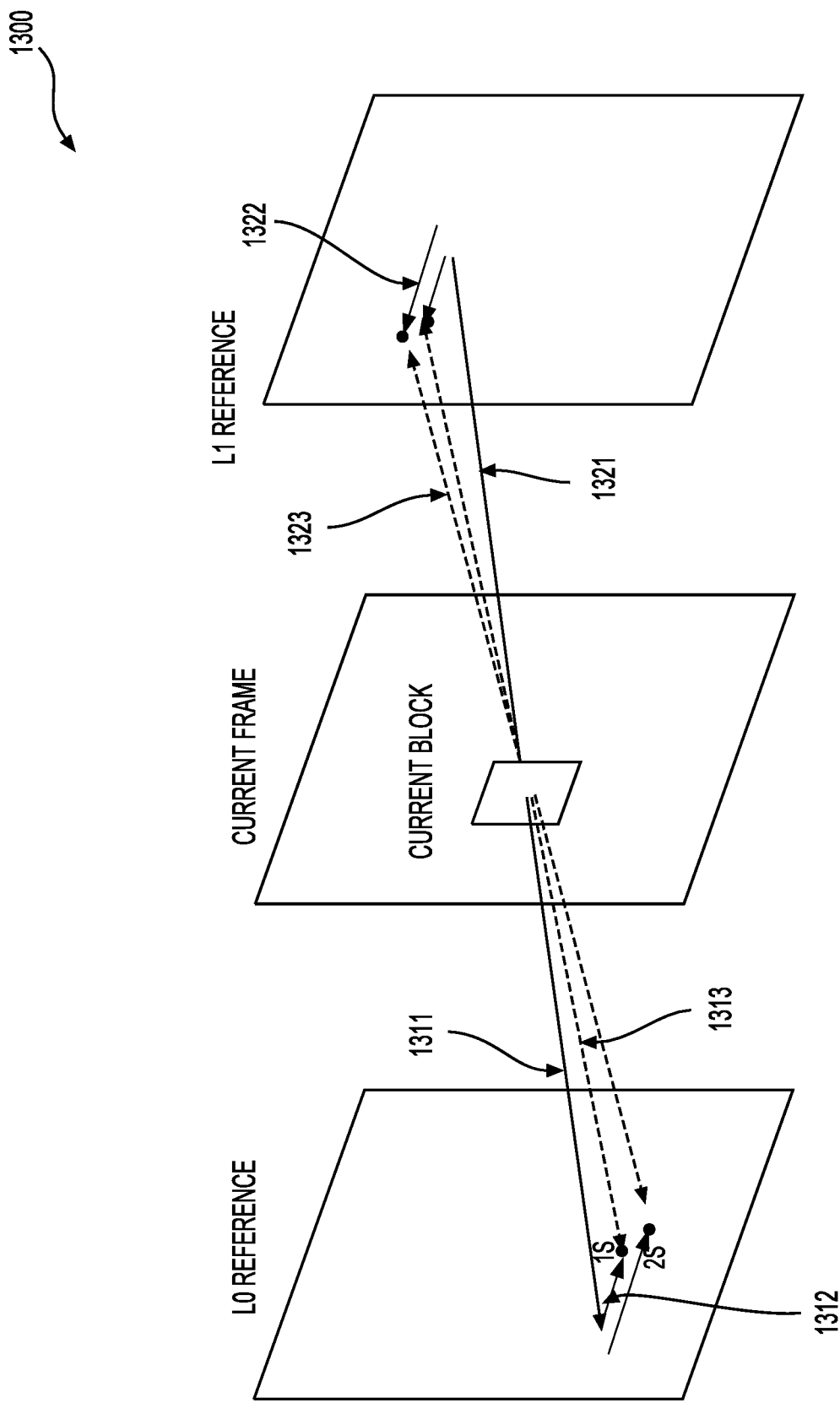
FIG. 13 shows a diagram for merge with motion vector difference (MMVD) according to an embodiment of the disclosure.

FIG. 13 shows a diagram 1300 for MMVD according to an embodiment of the disclosure. In an example, the starting point MV is shown by (1311) (for example according to the prediction direction IDX and base candidate IDX), the offset is shown by (1312) (for example according to the distance IDX and the search direction IDX), and the final MV predictor is shown by (1313) in FIG. 13. In another example, the starting point MV is shown by (1321) (for example according to the prediction direction IDX and base candidate IDX), the offset is shown by (1322) (for example according to the distance IDX and the search direction IDX), and the final MV predictor is shown by (1323) in FIG. 13.

Figure 14:
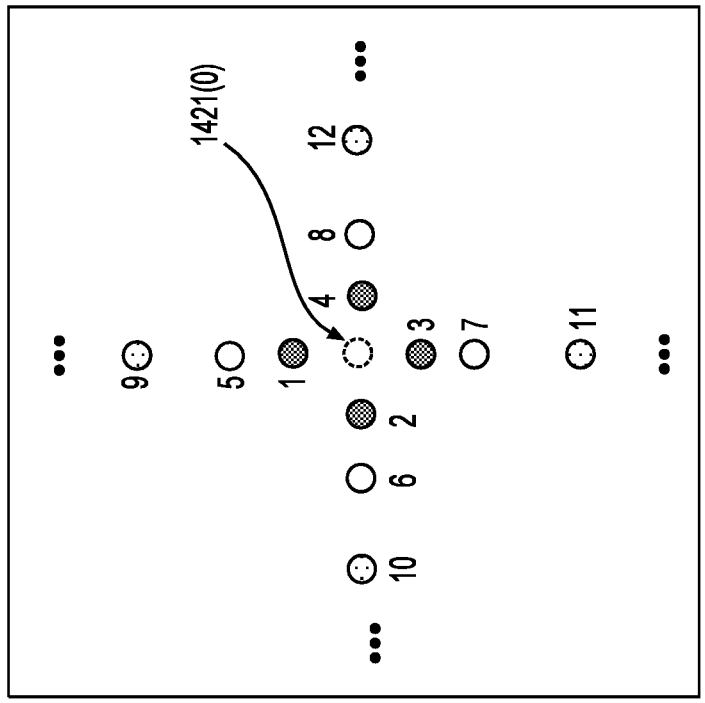
FIG. 14 shows examples for MMVD according to an embodiment of the disclosure.
Figure 14:
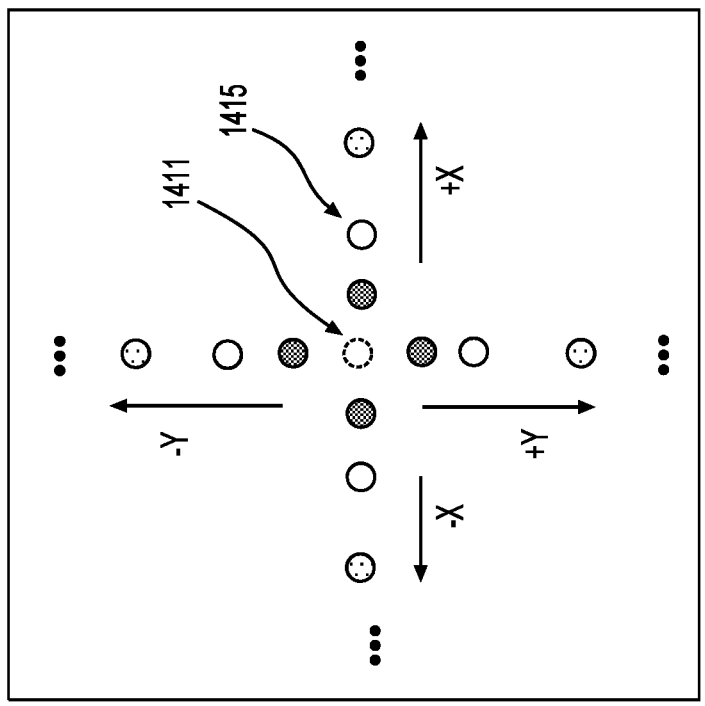

FIG. 14 shows examples for MMVD according to an embodiment of the disclosure. For example, the starting point MV is shown by (1411) (for example according to the prediction direction IDX and base candidate IDX). In the FIG. 14 example, 4 search directions, such as +Y, −Y, +X and −X, are used, and the four search directions can be indexed by 0, 1, 2, 3. The distance can be indexed by 0 (0 distance to the starting point MV), 1 (1s to the starting point MV), 2 (2s to the starting point MV), 3 (3s to the starting point), and the like. Thus, when the search direction IDX is 2, and the distance IDX is 2, the final MV predictor is shown as (1415).

In another example, the search direction and the distance can be combined for indexing. For example, the starting point MV is shown by (1421) (for example according to the prediction direction IDX and base candidate IDX). The search direction and the distance are combined to be indexed by 0-12 as shown in FIG. 14.

According to another aspect of the disclosure, a method that is referred to as affine merge with motion vector difference (Affine MMVD) can be used in a video codec. The Affine MMVD selects the first available affine merge candidate from the sub-block based merge list as a base predictor (also referred to as base candidate). Then, a motion vector offset is applied to each control point's motion vector value from the base predictor. When there's no affine merge candidate available, Affine MMVD is not used.

In some examples, a distance index and an offset direction index are subsequently signaled. In an example, an offset table is used, and the distance index is signaled to indicate which distance offset in the distance-offset table to be used. Table 4 is an example of the distance-offset table.

TABLE 4

Distance-Offset Table

| Distance IDX | 0 | 1 | 2 | 3 | 4 |
|---|---|---|---|---|---|
| Distance-offset | ½-pel | 1-pel | 2-pel | 4-pel | 8-pel |

In an example, the offset direction index can represent one of four directions according to an offset-direction table. Table 5 is an example of the offset-direction table. In the example, only x or y direction may have an MV difference, but not in both directions.

TABLE 5

Offset-Direction Table

| Offset Direction IDX | 00 | 01 | 10 | 11 |
|---|---|---|---|---|
| x-dir-factor | +1 | −1 | 0 | 0 |
| y-dir-factor | 0 | 0 | +1 | −1 |

In some examples, Table 4 and Table 5 are default tables known by both encoder and decoder.

In an embodiment, the inter prediction is Uni-prediction, and the signaled distance offset is applied on the offset direction for each control point predictor to generate the MV value of each control point.

In another embodiment, the inter prediction is Bi-prediction, the signaled distance offset is applied on the signaled offset direction for control point predictor's L0 motion vector. Further, the offset to be applied on L1 MV is applied on a mirrored or a scaled basis. For example, the inter prediction is Bi-prediction, the signaled distance offset is applied on the signaled offset direction for control point predictor's L0 motion vector. For L1 CPMV, the offset is applied on a mirrored basis, which means the same amount of distance offset with the opposite direction is applied.

In another example, a POC distance based offset mirroring method is used for Bi-prediction. When the base candidate is bi-predicted, the offset applied to L0 is as signaled, and the offset on L1 depends on the temporal position of the reference pictures on list 0 and list 1. When both reference pictures are on the same temporal side of the current picture, the same distance offset and same offset directions are applied for CPMVs of both L0 and L1. When the two reference pictures are on different sides of the current picture, the CPMVs of L1 will have the distance offset applied on the opposite offset direction.

In another example, a POC distance based offset scaling method is used for Bi-prediction. When the base candidate is bi-predicted, the offset applied to L0 is as signaled, and the offset on L1 will be scaled based on the temporal distance of reference pictures on list 0 and list 1.

In another embodiment, the distance offset value range is extended into multiple offset tables for example with different picture resolutions. Then, one of the offset tables is adaptively selected based on the picture resolution. Table 6 includes three offset tables with different picture resolutions.

TABLE 6

Extended Distance-Offset Table

| Distance IDX | 0 | 1 | 2 | 3 | 4 | Condition |
|---|---|---|---|---|---|---|
| Distance-offset Table 1 | ½-pel | 1-pel | 2-pel | 4-pel | 8-pel | Picture Height >= 1080 |
| Distance-offset Table 2 | ⅛-pel | ¼-pel | ½-pel | 1-pel | 2-pel | 720 <= Picture Height < 1080 |
| Distance-offset Table 3 | 1/16-pel | ⅛-pel | ¼-pel | ½-pel | 1-pel | Picture Height < 720 |

According to an aspect of the disclosure, an affine model can be represented using some affine parameters and a base motion vector.

In some embodiments, using a four-parameter affine model, a MV ($mv^h$, $mv^v$) at the position (x, y) can be derived according to (Eq. 2); and using a six-parameter affine mode, a MV ($mv^h$, $mv^v$) at the position (x, y) can be derived according to (Eq. 3).

$$\begin{cases} mv^h(x, y) = a(x - x_{base}) - b(y - y_{base}) + mv^h_{base} \\ mv^v(x, y) = b(x - x_{base}) + a(y - y_{base}) + mv^v_{base} \end{cases} \quad (Eq.\ 2)$$

$$\begin{cases} mv^h(x, y) = a(x - x_{base}) + c(y - y_{base}) + mv^h_{base} \\ mv^v(x, y) = b(x - x_{base}) + d(y - y_{base}) + mv^v_{base} \end{cases} \quad (Eq.\ 3)$$

wherein $MV_{base}$ ($mv^h_{base}$, $mv^v_{base}$) denotes a base MV at a base position ($x_{base}$, $y_{base}$), and (a, b) represent the affine parameters to be used, with the base MV $MV_{base}$ ($mv^h_{base}$, $mv^v_{base}$) in 4-parameter model, (a, b, c, d) represent affine parameters to be used, with the base MV $MV_{base}$ ($mv^h_{base}$, $mv^v_{base}$), in 6-parameter affine model. The affine parameters can be calculated according to (Eq. 4)-(Eq.6):

$$a = \frac{(mv_1^h - mv_0^h)}{Lx}, b = \frac{(mv_1^v - mv_0^v)}{Lx} \qquad \text{(Eq. 4)}$$

$$c = \frac{(mv_2^h - mv_0^h)}{Ly}, d\frac{(mv_2^v - mv_0^v)}{Ly}, \qquad \text{(Eq. 5)}$$

$$Lx = x_1 - x_0, Ly = y_2 - y_0 \qquad \text{(Eq. 6)}$$

where $MV_0$ ($mv_0^h$, $mv_0^v$), $MV_1$ ($mv_1^h$, $mv_1^v$) and $MV_2$ ($mv_2^h$, $mv_2^v$), represent three Control Point MVs (CPMVs) at positions ($x_0$, $y_0$), ($x_1$, $y_1$) and ($x_2$, $y_2$), respectively. ($x_0$, $y_0$), ($x_1$, $y_1$) and ($x_2$, $y_2$) are usually set to be the top-left, top-right and bottom-left corner of an affine coded block with size equal to w×h, so Lx is set to be w and Ly is set to be h.

It is noted that the base MV is not necessary to be one of the CPMVs, although it is set to be the CPMV $MV_0$ at the top-left corner ($x_0$, $y_0$) in some examples, such as VTM-3.0.

According to an aspect of the disclosure, affine inheritance can be addressed by affine inheritance crossing CTU rows and affine inheritance inside a CTU.

For affine inheritance crossing CTU rows, in some embodiments, the storage of the CU width and the x-component of the bottom-left coordinate of each 8×8 block is removed from line-buffer. When the current CU applies affine inheritance from a neighboring 4×4 block such as B0 as FIG. 1, the 4×4 block right-next to B0, or left-next to B0 which is also affine-coded and has the same reference index as B0, is chosen as B0'. The MVs stored in B0 and B0' are accessed as MVB and MVB', MV0 and MV1 are set to be MVB and MVB' to derive a and b by Eq. 4 with Lx=4. CPMVs of the current CU are derived by Eq. 2 with the center position of B0 as the base position and MVB as the base MV.

Accordingly, in an example, at most 36 4×4 blocks may be accessed at CTU-row boundary. The additional information needs to be loaded on cache is reduced from 4464 bits to 2×72=144 bits (or 2×10=20 bytes in a byte-alignment implementation).

For affine inheritance inside a CTU row, in some embodiments, affine parameters are stored instead of three CPMVs and the block dimensions. When the current CU applies affine-inheritance merge mode, affine parameters are directly copied from the neighbouring 4×4 block B to be inherited. And the MV of each sub-block in the current CU is derived by Eq. 3 with the center position of B as the base position and MVB as the base MV. When the current CU applies affine AMVP mode, CPMVs of the current CU are derived by Eq. 3 also with the center position of B as the base position and MVB as the base MV, and the derived CPMVs will serve as the MVPs.

Each parameter is stored as an 8-bit signed integer. So 2×4×8=64 bits are required to be store affine parameters in each 8×8 block inside a CTU. In an example, the In-CTU-buffer is increased by 48×64=3072 bits (or 48×8=384 bytes in a byte-alignment implementation). It is noted that, in the affine heritance inside a CTU row, one set of affine parameters are calculated at most only once.

Aspects of the disclosure provide techniques and methods to improve coding efficiencies in sub-blocked based merge with offsets, such as affine MMVD, affine model with affine parameters and base MV, sub-block-based TMVP (SbTMVP) and the like. The proposed methods may be used separately or combined in any order. Further, each of the methods (or embodiments), encoder, and decoder may be implemented by processing circuitry (e.g., one or more processors or one or more integrated circuits). In one example, the one or more processors execute a program that is stored in a non-transitory computer-readable medium. In the following, the term block may be interpreted as a prediction block, a coding block, or a coding unit, i.e. CU.

According to some aspects of the disclosure, when a table is used in an inter prediction tool, the table can be adaptively selected from multiple tables based on certain conditions.

According to an aspect of the disclosure, adaptive tables can be used for affine merge with motion vector difference (Affine MMVD). In affine MMVD, the offset direction table and/or the distance offset table may be adaptively selected from multiple predefined tables and may be selected based on certain conditions.

In some embodiments, the offset direction table and/or the distance offset table may be selected based on the control point motion vectors (CPMVs).

In an embodiment, the offset direction table and/or the offset table may be adaptively selected from multiple tables based on the CPMV magnitude. In an example, the multiple tables correspond to different magnitude ranges. Based on a range of a CPMV magnitude, a corresponding table can be selected. Based on a received index value, suitable offset direction or distance offset can be determined based on the selected table.

In another embodiment, the offset direction table and/or the offset table may be adaptively selected from multiple tables based on the CPMV precision. In some example, when a magnitude of a CPMV is 16 times of an integer, the CPMV has a precision of 1 pel; when a magnitude of a CPMV is 8 times of an integer, the CPMU has a precision of half pel. In an example, the multiple tables correspond to different MV precision. Based on the precision of a CPMV, a corresponding table can be selected. Based on a received index, suitable offset direction or distance offset can be determined based on the selected table.

In another embodiment, the offset direction table and/or the offset table may be adaptively selected from multiple tables based on the magnitude of CPMV fractional parts. In an example, the multiple tables correspond to precision of the fractional parts. Based on the precision of the fractional parts, a corresponding table can be selected. For example, when the fractional part has high precision, a table with small offset values may be selected; and when the fractional part ha a low precision, a table with relatively large offset values may be selected.

In another embodiment, the offset direction table and/or the offset table may be adaptively selected from multiple tables based on the magnitude of the difference between CPMV0 and CPMV1, and/or the difference between CPMV0 and CPMV2. In some examples, the difference of control point MVs is related to affine model parameters. When table is selected based on the difference, the table is actually selected based on affine model parameters.

In another embodiment, the offset direction table and/or the offset table may be adaptively selected from multiple tables based on the magnitude of the fractional part of the difference between CPMV0 and CPMV1, and/or the magnitude of the fractional part of the difference between CPMV0 and CPMV2. In an example, when the precision of the fractional part of the difference is small, a table with relatively small offset values is selected.

According to another aspect of the disclosure, when the base candidate is bi-predicted, the offset values (e.g., determined based offset table and signaled index) can be applied based on the temporal distances from the current picture to the selected reference pictures on reference picture list L0 and reference picture L1, respectively.

In an embodiment, when the two reference pictures are on the same temporal side of the current picture, same offset is applied on MVs for both reference lists.

In another embodiment, when the two reference pictures are on the same temporal side of the current picture, offset values are applied on MVs on the two reference lists on a mirrored basis. In an example, the signaled offset (e.g., determined based offset table and signaled index) is applied on MVs on reference list L0, and the signaled offset with opposite sign (the opposite of the signaled offset) is applied on MVs on reference list L1. In another example, the signaled offset is applied on MVs on reference list L1, and the signaled offset with opposite sign (the opposite of the signaled offset) is applied on MVs on reference list L0.

In another embodiment, when the two reference pictures are on the opposite temporal sides of the current picture, the same offset is applied on MVs for both reference lists.

In another embodiment, when the two reference pictures are on the opposite temporal sides of the current picture, offset values are applied on MVs on the two reference lists on a mirrored basis. In a n example, the signaled offset is applied on MVs on reference list L0, and the signaled offset with opposite sign (the opposite of the signaled offset) is applied on MVs on reference list L1. In another example, the signaled offset is applied on MVs on reference list L1, and the signaled offset with opposite sign (the opposite of the signaled offset) is applied on MVs on reference list L0.

In another embodiment, when the two reference pictures are on the same temporal sides of the current picture, offset values are applied on MVs on the two reference lists with scaling. The scaling ratio is calculated based on the ratio of a first temporal distance between the current picture and the reference picture on L0 and a second temporal distance between the current picture and the reference picture on L1. The scaling operations may be the same as the scaling operations used for TMVP. In an example, the signaled offset is applied on MVs on reference list L0, and the scaled offset of the signaled offset is applied for MVs on reference list L1. In another example, the signaled offset is applied on MVs on reference list L1, and the scaled offset of the signaled offset is applied on MVs on reference list L0.

In one embodiment, when the two reference pictures are on the opposite temporal sides of the current picture, the offset values are applied on MVs on the two reference lists with scaling. The scaling ratio is calculated based on the ratio of a first temporal distance between the current picture and the reference picture on L0 and a second temporal distance between the current picture and the reference picture on L1. The scaling operations may be the same as the scaling operations used for TMVP. In an example, the signaled offset is applied on MVs on reference list L0, and the scaled offset of the signaled offset is applied on MVs on reference list L1. In another example, the signaled offset is applied on MVs on reference list L1, and the scaled offset of the signaled offset is applied on MVs on reference list L0.

According to another aspect of the disclosure, the signaled offsets can be applied on affine parameters instead of motion vectors. In some examples, when affine model is represented as affine parameters with base MV, the affine prediction type is referred to affine merge with affine parameter differences.

For simplification, in the following description, the base motion vector is denoted (e, f), e is the horizontal component and f is the vertical component.

In an example, with the 6-parameter affine model, a MV (MVx, MVy) at the position (x, y) can be derived as (Eq. 7):

$$\begin{cases} MVx = ax + by + e \\ MVy = cx + dy + f \end{cases} \quad (Eq.\ 7)$$

In another example, with the 4-parameter affine model, the MV at the position (x, y) can be derived as (Eq. 8)"

$$\begin{cases} MVx = ax + by + e \\ MVy = -bx + ay + f \end{cases} \quad (Eq.\ 8)$$

In an embodiment, the signaled offset values are applied on one or more affine parameters {a, b, c, d}. Table 7 is an offset table example. In Table 7, the offset magnitude values Delta0-Delta7 may be any suitable predefined values. The number of offset magnitude values may not be limited by this example, the number of offset magnitude values may have any number.

TABLE 7

| | Offset Table | | | | | | | |
|---|---|---|---|---|---|---|---|---|
| Offset IDX | 0 | 1 | 2 | 3 | 4 | 5 | 6 | 7 |
| OffsetMagnitude | Delta0 | Delta1 | Delta2 | Delta3 | Delta4 | Delta5 | Delta6 | Delta7 |

In an embodiment, only one from {a, c} can be changed; and only one from {b, d} can be changed (with offset applied on), and the same offset may be signaled and applied on the parameters to change.

Table 8 can be used as an offset direction table and Table 7 can be used as an offset table in some examples. The number of direction factors in the offset direction table may not be limited by this example, and it may have any number of director factors in the table.

TABLE 8

| | Offset-direction Table | | | | | | | |
|---|---|---|---|---|---|---|---|---|
| Offset element IDX | 0 | 1 | 2 | 3 | 4 | 5 | 6 | 7 |
| DirectionFactor_a | +1 | −1 | 0 | 0 | +1 | −1 | 0 | 0 |
| DirectionFactor_b | 0 | 0 | +1 | −1 | 0 | 0 | +1 | −1 |
| DirectionFactor_c | +1 | −1 | 0 | 0 | 0 | 0 | +1 | −1 |
| DirectionFactor_d | 0 | 0 | +1 | −1 | +1 | −1 | 0 | 0 |

In this example, after applying the offsets to affine parameters {a, b, c, d}, the new affine parameters {a', b', c', d'} may be calculated as in equation (Eq. 9):

$$\begin{cases} a' = a + (\textit{OffsetMagnitude} \times \text{DirectionFactor\_a}) \\ b' = b + (\textit{OffsetMagnitude} \times \text{DirectionFactor\_b}) \\ c' = c + (\textit{OffsetMagnitude} \times \text{DirectionFactor\_c}) \\ d' = d + (\textit{OffsetMagnitude} \times \text{DirectionFactor\_d}) \end{cases} \quad \text{(Eq. 9)}$$

In another embodiment, only 1 from {a, c} can be changed; and only 1 from {b, d} can be changed, and different offset table is used for {a,c} and {b, d}. The signaled index of offset may be used for all affine parameters.

Table 8 can be used as offset direction table, and Table 9 can be used as offset table in an example. It is noted that the number of offset magnitude values may not be limited by this example, the number of offset magnitude values can be any suitable number.

TABLE 9

| | Offset Table | | | |
|---|---|---|---|---|
| Offset IDX | 0 | 1 | 2 | 3 |
| OffsetMagnitude_a | Delta_a0 | Delta_a1 | Delta_a2 | Delta_a3 |
| OffsetMagnitude_b | Delta_b0 | Delta_b1 | Delta_b2 | Delta_b3 |
| OffsetMagnitude_c | Delta_c0 | Delta_c1 | Delta_c2 | Delta_c3 |
| OffsetMagnitude_d | Delta_d0 | Delta_d1 | Delta_d2 | Delta_d3 |

In the example, after applying the offsets to affine parameters {a, b, c, d}, the new affine parameters {a', b', c', d' } may be calculated as in equation (Eq. 10):

$$\begin{cases} a' = a + (\text{OffsetMagnitude\_a} \times \text{DirectionFactor\_a}) \\ b' = b + (\text{OffsetMagnitude\_b} \times \text{DirectionFactor\_b}) \\ c' = c + (\text{OffsetMagnitude\_c} \times \text{DirectionFactor\_c}) \\ d' = d + (\text{OffsetMagnitude\_d} \times \text{DirectionFactor\_d}) \end{cases} \quad \text{(Eq. 10)}$$

In another embodiment, only 1 of {a, b, c, d} may be changed at a time, and one offset table is used for all affine parameters. In an example, the offset direction table may be set as shown in Table 10:

TABLE 10

| | Offset-direction Table | | | | | | | |
|---|---|---|---|---|---|---|---|---|
| Offset element IDX | 0 | 1 | 2 | 3 | 4 | 5 | 6 | 7 |
| DirectionFactor_a | +1 | −1 | 0 | 0 | 0 | 0 | 0 | 0 |
| DirectionFactor_b | 0 | 0 | +1 | −1 | 0 | 0 | 0 | 0 |
| DirectionFactor_c | 0 | 0 | 0 | 0 | +1 | −1 | 0 | 0 |
| DirectionFactor_d | 0 | 0 | 0 | 0 | 0 | 0 | +1 | −1 |

In another embodiment, only 1 of {a, b, c, d} may be changed at a time, and each of {a, b, c, d} has a corresponding offset table individually.

In another embodiment, all of affine parameters {a, b, c, d} may be changed at the same time, and one offset table is used for all affine parameters.

In another embodiment, all of affine parameters {a, b, c, d} may be changed at the same time, and each affine parameter may have a corresponding offset table individually.

In some embodiments, offset values are applied on affine parameter {a, b, c, d, e, f}.

In an embodiment, only 1 from {a, c} can be changed; and only 1 from {b, d} can be changed; and only 1 from {e, f} can be changed, and the same offset is applied the parameters for change.

In another embodiment, only 1 from {a, c} can be changed; and only 1 from {b, d} can be changed; and only 1 from {e, f} can be changed; and different offset tables are used for {a, c}, {b, d}, and {e, f}. The signaled offset index is used for all.

According to an aspect of the disclosure, SbTMVP with motion vector difference is used. In some embodiments, for a block coded with SbTMVP mode, the block can be divided into multiple sub-blocks, and the sub-blocks can have different MV values. To apply MV offset on a block coded with SbTMVP mode, the offset values may be applied to each sub-block's MV following certain rules.

In an embodiment, the same MV offset may be applied on motion vector values of all sub-blocks of the block in SbTMVP mode. In an example, the MV offset is selected from a table based on an index that is received from the coded video bitstream.

In another embodiment, the selected MV offset may be applied first for a selected sub-block. In some examples, the offset value may be applied on other sub-blocks after scaling. The scaling may be based on the ratio of original MV value of the first selected block and the MV values of each of the remaining sub-blocks.

Aspects of the disclosure also provide techniques to select a base candidate when multiple base candidates are used in sub-block based merge with motion vector difference (MMVD). Depending on the number of base candidates that are allowed to be used, the base candidates may be selected from the sub-block based merge candidate list following certain rules.

In some embodiments, when the maximum number of base candidates for sub-block based MMVD is two, the selected base candidates may be signaled by the base candidate index. Thus, 1 binary bit can be used to signal a selected base candidate.

In an embodiment, the first available 6-parameter affine merge candidate and the first available 4 parameter affine merge candidate may be used as the base candidates.

In another embodiment, up to 2 candidates from 6-parameter candidates and 4-parameter affine candidates can be used for base candidates. In some examples, the first available candidate in 6-parameter affine candidate(s) and the first available candidate in the 4-parameter affine candidate(s) may be selected. When there's no 6-parameter affine candidate exists, pick two of the first available candidates in 4-parameter candidates if available. When there's no 4-parameter affine candidate exists, pick two of the first available candidates in 6-parameter candidates if available.

In another embodiment, only up to two of the first available 6-parameter affine merge candidates may be used as base candidates. If only one 6-parameter affine merge candidate is available, the base candidate index signaling may be inferred to be 0, and does not need to be signaled.

In another embodiment, only up to two of the first available 4-parameter affine merge candidates may be used as base candidates. If only one 4-parameter affine merge candidate is available, the base candidate index signaling may be inferred to be 0, and does not need to be signaled.

In another embodiment, the first available SbTMVP candidate may be used as a base candidate, and the first available affine merge candidate may be used as the other base candidate. If only one of the base candidates is available, the base candidate index signaling may be inferred to be 0 and does not need to be signaled.

In another embodiment, up to two base candidates may be used. In an example, one base candidate is selected from SbTMVP candidates if available; if SbTMVP candidate is unavailable, two affine merge candidates can be used as base candidates. If only one affine merge candidate is available, the affine merge candidate can be the base candidate. If only one base candidate is available, the base candidate index signaling may be inferred to be 0.

More generally, in some embodiments, multiple base candidates, such as N base candidates (N is a positive integer) may be used for sub-block based MMVD, and the selected base candidate may be signaled by the base candidate index.

In an embodiment, the first N available candidates from affine merge candidates are used as base candidates.

In another embodiment, the first N available candidates including SbTMVP candidates and affine merge candidates may be used as based candidates.

It is noted that when only one base candidate may be used for sub-block based MMVD, the selected base candidate may be used without signaling.

In an embodiment, the first available candidate on the sub-block based merge candidate list may be used as base candidate.

In another embodiment, the first available affine merge candidate on the sub-block based merge candidate list may be used as base candidate;

In another embodiment, the first available SbTMVP candidate on the sub-block based merge candidate list may be used as base candidate.

Figure 15:
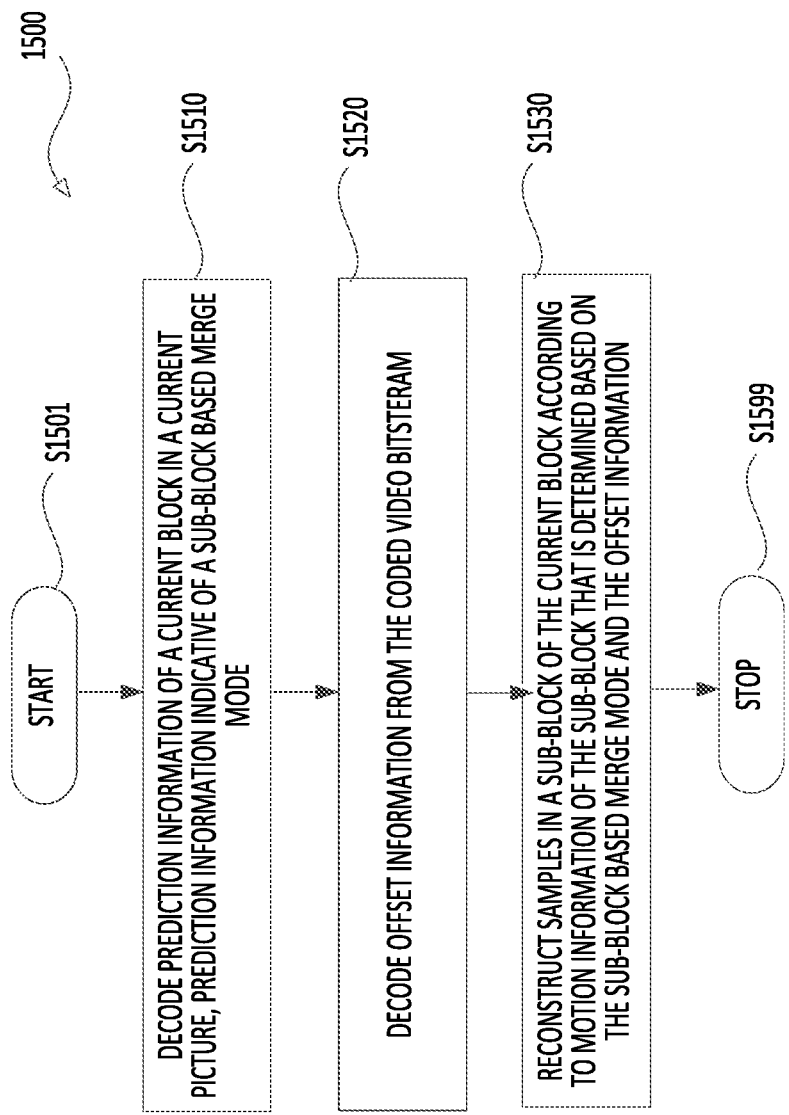
FIG. 15 shows a flow chart outlining a process example according to some embodiments of the disclosure.

FIG. 15 shows a flow chart outlining a process (1500) according to an embodiment of the disclosure. The process (1500) can be used in the reconstruction of a block coded in intra mode, so to generate a prediction block for the block under reconstruction. In various embodiments, the process (1500) are executed by processing circuitry, such as the processing circuitry in the terminal devices (210), (220), (230) and (240), the processing circuitry that performs functions of the video encoder (303), the processing circuitry that performs functions of the video decoder (310), the processing circuitry that performs functions of the video decoder (410), the processing circuitry that performs functions of the video encoder (503), and the like. In some embodiments, the process (1500) is implemented in software instructions, thus when the processing circuitry executes the software instructions, the processing circuitry performs the process (1500). The process starts at (S1501) and proceeds to (S1510).

At (S1510), prediction information of a current block is decoded from a coded video bitstream. The prediction information is indicative of a sub-block based merge mode, such as affine MMVD, affine model with affine parameters and base MV, sub-block based TMVP (SbTMVP)

At (S1520), offset information is decoded from the coded video bitstream. In some embodiments, a table is adaptively selected from multiple predefined tables based on, for example, control point motion vectors. Then, offset information, such as offset direction and/or magnitude can be determined based on an index decoded from the coded video bitsteam. In an embodiment, the offset is to be applied to motion vector, such as control point motion vector, sub-block motion vector and the like. In another embodiment, the offset is to be applied to affine parameters.

At (S1530), samples of a sub-block in the current block are constructed according to the motion information of the sub-block. The motion information is determined based on the sub-block based merge mode and the offset information. Then, the process proceeds to (S1599), and terminates.

The techniques described above, can be implemented as computer software using computer-readable instructions and physically stored in one or more computer-readable media. For example, FIG. 16 shows a computer system (1600) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 16:
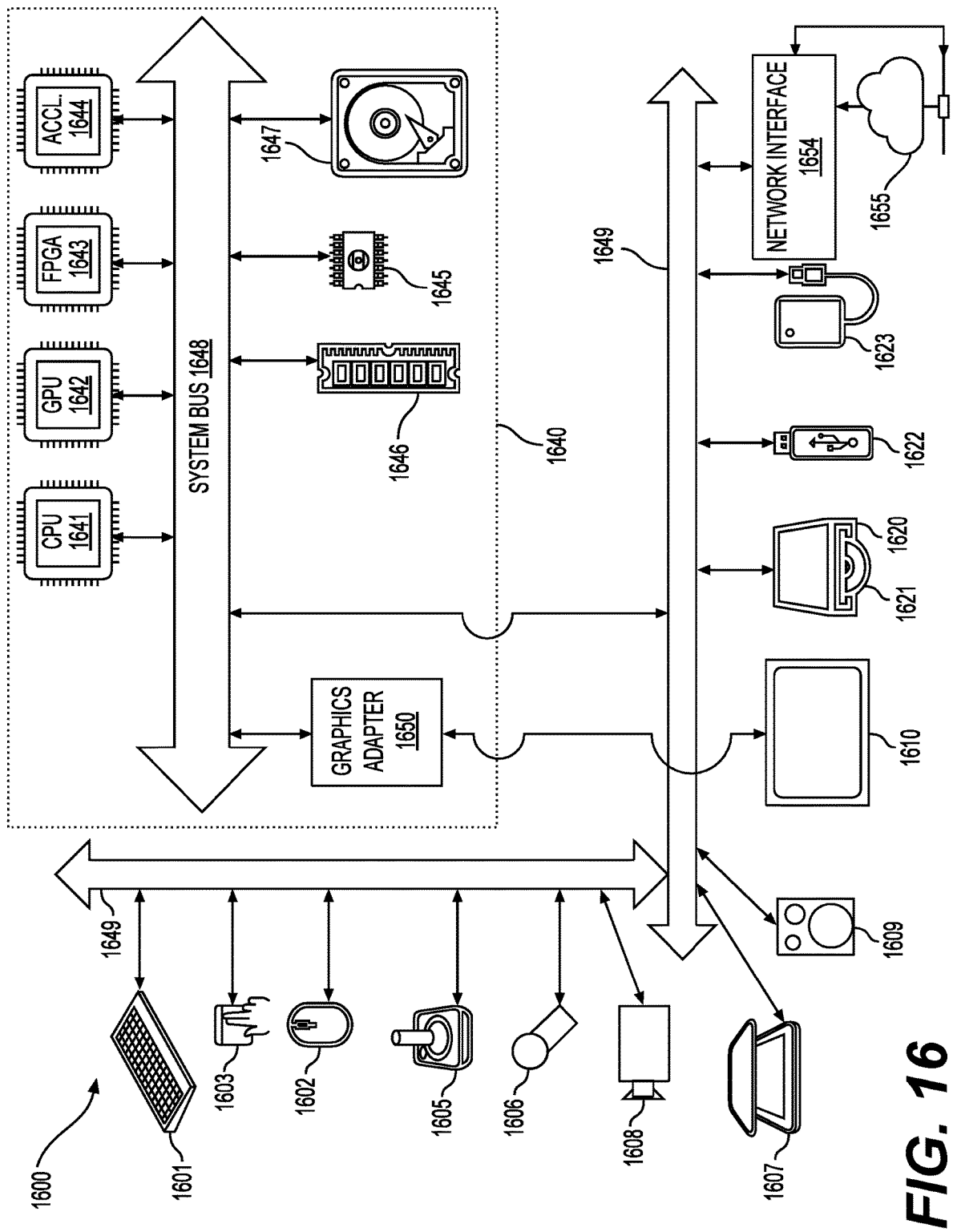
FIG. 16 is a schematic illustration of a computer system in accordance with an embodiment.

The components shown in FIG. 16 for computer system (1600) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1600).

Computer system (1600) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1601), mouse (1602), trackpad (1603), touch screen (1610), data-glove (not shown), joystick (1605), microphone (1606), scanner (1607), camera (1608).

Computer system (1600) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1610), data-glove (not shown), or joystick (1605), but there can also be tactile feedback devices that do not serve as input devices), audio output devices (such as: speakers (1609), headphones (not depicted)), visual output devices (such as screens (1610) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1600) can also include human accessible storage devices and their associated media such as optical media including CD/DVD ROM/RW (1620) with CD/DVD or the like media (1621), thumb-drive (1622), removable hard drive or solid state drive (1623), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1600) can also include an interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1649) (such as, for example USB ports of the computer system (1600)); others are commonly integrated into the core of the computer system (1600) by attachment to a system bus as described below (for example Ethernet interface into a PC computer system or cellular network interface into a smartphone computer system). Using any of these networks, computer system (1600) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1640) of the computer system (1600).

The core (1640) can include one or more Central Processing Units (CPU) (1641), Graphics Processing Units (GPU) (1642), specialized programmable processing units in the form of Field Programmable Gate Areas (FPGA) (1643), hardware accelerators for certain tasks (1644), and so forth. These devices, along with Read-only memory (ROM) (1645), Random-access memory (1646), internal mass storage such as internal non-user accessible hard drives, SSDs, and the like (1647), may be connected through a system bus (1648). In some computer systems, the system bus (1648) can be accessible in the form of one or more physical plugs to enable extensions by additional CPUs, GPU, and the like. The peripheral devices can be attached either directly to the core's system bus (1648), or through a peripheral bus (1649). Architectures for a peripheral bus include PCI, USB, and the like.

CPUs (1641), GPUs (1642), FPGAs (1643), and accelerators (1644) can execute certain instructions that, in combination, can make up the aforementioned computer code. That computer code can be stored in ROM (1645) or RAM (1646). Transitional data can be also be stored in RAM (1646), whereas permanent data can be stored for example, in the internal mass storage (1647). Fast storage and retrieve to any of the memory devices can be enabled through the use of cache memory, that can be closely associated with one or more CPU (1641), GPU (1642), mass storage (1647), ROM (1645), RAM (1646), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1600), and specifically the core (1640) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1640) that are of non-transitory nature, such as core-internal mass storage (1647) or ROM (1645). The software implementing various embodiments of the present disclosure can be stored in such devices and executed by core (1640). A computer-readable medium can include one or more memory devices or chips, according to particular needs. The software can cause the core (1640) and specifically the processors therein (including CPU, GPU, FPGA, and the like) to execute particular processes or particular parts of particular processes described herein, including defining data structures stored in RAM (1646) and modifying such data structures according to the processes defined by the software. In addition or as an alternative, the computer system can provide functionality as a result of logic hardwired or otherwise embodied in a circuit (for example: accelerator (1644)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

APPENDIX A: ACRONYMS

JEM: joint exploration model
VVC: versatile video coding
BMS: benchmark set
MV: Motion Vector
HEVC: High Efficiency Video Coding
SEI: Supplementary Enhancement Information
VUI: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory RAM: Random Access Memory
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas
SSD: solid-state drive
IC: Integrated Circuit
CU: Coding Unit While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for video decoding in a decoder, comprising:
decoding prediction information of a current block in a current picture from a coded video bitstream, the prediction information being indicative of a sub-block based merge mode;
decoding offset information from the coded video bitstream;
selecting an offset table from multiple predefined tables based on a control point motion vector of the current block; and
reconstructing a sample in a sub-block of the current block according to motion information of the sub-block that is determined based on the sub-block based merge mode, the selected offset table, and the offset information,
wherein the selecting the offset table includes at least one of:
selecting the offset table from the multiple predefined tables based on a magnitude of the control point motion vector,
selecting the offset table from the multiple predefined tables based on a precision of the control point motion vector;
selecting the offset table from the multiple predefined tables based on a magnitude of a fractional part of the control point motion vector;
selecting the offset table from the multiple predefined tables based on a magnitude of a difference between a first control point motion vector and a second control point motion vector; and
selecting the offset table from the multiple predefined tables based on a magnitude of a fractional part of a difference between the first control point motion vector and the second control point motion vector.

2. The method of claim 1, wherein the sub-block based merge mode is affine merge mode with motion vector difference.

3. The method of claim 2, further comprising at least one of:
selecting an offset direction table from the multiple predefined tables based on the control point motion vector of the current block; and
selecting a distance offset table from the multiple predefined tables based on the control point motion vector of the current block.

4. The method of claim 2, wherein a base candidate of the current block in the affine merge mode with motion vector difference is bi-predicted based on a first reference picture and a second reference picture, the method further comprising:
applying the offset information to a first motion vector associated with the first reference picture and a second motion vector associated with the second reference picture based on temporal distances from the current picture to the first reference picture and the second reference picture.

5. The method of claim 4, further comprising at least one of:
applying a same offset to the first motion vector associated with the first reference picture and the second motion vector associated with the second reference picture;
applying offsets with a same magnitude and opposite signs to the first motion vector associated with the first reference picture and the second motion vector associated with the second reference picture; and
applying offsets that are scaled according to the temporal distances from the current picture to the first reference picture and the second reference picture.

6. The method of claim 1, wherein the sub-block based merge mode is affine merge mode with affine parameter difference, and the method further comprises:
applying an offset on at least an affine parameter.

7. The method of claim 6, further comprising:
selecting the offset and the affine parameter according to predefined tables and an index decoded from the coded video bitstream.

8. The method of claim 1, wherein the sub-block based merge mode is sub-block based temporal motion vector prediction (SbTMVP) mode, and the method further comprises at least one of:
applying a same motion vector offset to respective motion vectors of plural sub-blocks; and
applying a motion vector offset and a scaled motion vector offset respectively to a first motion vector of a first sub-block and a second motion vector of a second sub-block.

9. The method of claim 1, further comprising:
forming a base candidate group including one or more base candidates;
selecting a base candidate from the base candidate group.

10. The method of claim 9, further comprising:
decoding an index from the coded video bitstream when a number of base candidates is larger than one.

11. An apparatus for video decoding, comprising:
processing circuitry configured to:
decode prediction information of a current block in a current picture from a coded video bitstream, the prediction information being indicative of a sub-block based merge mode;
decode offset information from the coded video bitstream;
select an offset table from multiple predefined tables based on a control point motion vector of the current block; and
reconstruct a sample in a sub-block of the current block according to motion information of the sub-block that is determined based on the sub-block based merge mode, the selected offset table, and the offset information,
wherein the selecting the offset table includes at least one of:

selecting the offset table from the multiple predefined tables based on a magnitude of the control point motion vector;

selecting the offset table from the multiple predefined tables based on a precision of the control point motion vector;

selecting the offset table from the multiple predefined tables based on a magnitude of a fractional part of the control point motion vector;

selecting the offset table from the multiple predefined tables based on a magnitude of a difference between a first control point motion vector and a second control point motion vector; and selecting the offset table from the multiple predefined tables based on a magnitude of a fractional part of a difference between the first control point motion vector and the second control point motion vector.

12. The apparatus of claim 11, wherein the sub-block based merge mode is affine merge mode with motion vector difference.

13. The apparatus of claim 12, wherein the processing circuitry is configured to perform at least one of:

selecting an offset direction table from the multiple predefined tables based on the control point motion vector of the current block; and selecting a distance offset table from the multiple predefined tables based on the control point motion vector of the current block.

14. The apparatus of claim 12, wherein a base candidate of the current block in the affine merge mode with motion vector difference is bi-predicted based on a first reference picture and a second reference picture, the processing circuitry is configured to:

apply the offset information to a first motion vector associated with the first reference picture and a second motion vector associated with the second reference picture based on temporal distances from the current picture to the first reference picture and the second reference picture.

15. The apparatus of claim 14, wherein the processing circuitry is configured to perform at least one of:

applying a same offset to the first motion vector associated with the first reference picture and the second motion vector associated with the second reference picture;

applying offsets with a same magnitude and opposite signs to the first motion vector associated with the first reference picture and the second motion vector associated with the second reference picture; and applying offsets that are scaled according to the temporal distances from the current picture to the first reference picture and the second reference picture.

16. The apparatus of claim 11, wherein the sub-block based merge mode is affine merge mode with affine parameter difference, and the processing circuitry is configured to apply an offset on at least an affine parameter.

17. The apparatus of claim 16, wherein the processing circuitry is configured to:

select the offset and the affine parameter according to predefined tables and an index decoded from the coded video bitstream.

18. The apparatus of claim 11, wherein the sub-block based merge mode is sub-block based temporal motion vector prediction (SbTMVP) mode, and the processing circuitry is configured to perform at least one of:

applying a same motion vector offset to respective motion vectors of plural sub-blocks; and applying a motion vector offset and a scaled motion vector offset respectively to a first motion vector of a first sub-block and a second motion vector of a second sub-block.

* * * * *